US012593824B2

(12) United States Patent
Wooten et al.

(10) Patent No.: US 12,593,824 B2
(45) Date of Patent: *Apr. 7, 2026

(54) LIVESTOCK MANAGEMENT SYSTEM AND METHOD

(71) Applicant: VENCE, CORP., San Diego, CA (US)

(72) Inventors: Frank Carter Wooten, Key Largo, FL (US); Patrick Singler, San Diego, CA (US); Michael Anthony Yarusinsky, Ashburn, VA (US); Scott Fitzgerald, Carlsbad, CA (US); Todd Parker, Escondido, CA (US); Haldun Komsuoglu, Philadelphia, PA (US); Matthew Hughes, San Diego, CA (US)

(73) Assignee: VENCE, CORP.

( * ) Notice: Subject to any disclaimer, the term of this patent is extended or adjusted under 35 U.S.C. 154(b) by 0 days.

This patent is subject to a terminal disclaimer.

(21) Appl. No.: 18/479,182

(22) Filed: Oct. 2, 2023

(65) Prior Publication Data

US 2024/0023520 A1 Jan. 25, 2024

Related U.S. Application Data

(63) Continuation of application No. 17/049,569, filed as application No. PCT/US2019/028510 on Apr. 22, 2019, now Pat. No. 11,832,584.

(Continued)

(51) Int. Cl.
*A01K 15/02* (2006.01)
*A01K 3/00* (2006.01)
(Continued)

(52) U.S. Cl.
CPC ............ *A01K 15/023* (2013.01); *A01K 3/001* (2021.08); *A01K 11/008* (2013.01); *A01K 29/005* (2013.01)

(58) Field of Classification Search
CPC .. A01K 15/023; A01K 11/008; A01K 29/005; A01K 3/001
See application file for complete search history.

(56) References Cited

U.S. PATENT DOCUMENTS

| | | | |
|---|---|---|---|
| 85,575 | A | 1/1869 | Drake |
| 377,588 | A | 2/1888 | E. Walsh, Jr. |

(Continued)

FOREIGN PATENT DOCUMENTS

| | | |
|---|---|---|
| AU | 199534570 | 10/1994 |
| AU | 2003239832 | 5/2002 |

(Continued)

OTHER PUBLICATIONS

Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.

(Continued)

*Primary Examiner* — John A Tweel, Jr.
(74) *Attorney, Agent, or Firm* — S.J. INTELLECTUAL PROPERTY LTD.

(57) ABSTRACT

A herd management system for monitoring and managing the movements of animals within a herd comprises a user interface for defining one or more virtual fences for each to comprise a paddock, a plurality of wireless tags affixed to the monitored animals, and a network server for managing communications between the user interface and wireless communication with the tags. The tags include devices for stimulating the animal to move as desired by the herd management system, including staying within a paddock or moving from one paddock to another as guided by the system.

20 Claims, 30 Drawing Sheets

Related U.S. Application Data

(60) Provisional application No. 62/661,040, filed on Apr. 22, 2018.

(51) Int. Cl.
A01K 11/00 (2006.01)
A01K 29/00 (2006.01)

(56) References Cited

U.S. PATENT DOCUMENTS

| | | | |
|---|---|---|---|
| 584,121 A | 6/1897 | E. Sanders | |
| 818,783 A | 4/1906 | T. F. Philippi | |
| 823,079 A | 6/1906 | T. Rais | |
| 1,016,752 A | 2/1912 | Leith | |
| 1,188,510 A | 6/1916 | Timson | |
| 1,364,137 A | 1/1921 | Pannier | |
| 1,759,400 A | 5/1930 | Hobbs | |
| 1,843,314 A | 2/1932 | Berntson et al. | |
| 1,863,037 A | 6/1932 | Archbold et al. | |
| 2,078,827 A | 4/1937 | Ketchum | |
| 2,420,020 A | 5/1947 | Snell | |
| 2,553,400 A | 5/1951 | Blair | |
| 2,570,048 A | 10/1951 | Cooke et al. | |
| 3,091,770 A | 6/1963 | Mcmurray et al. | |
| 3,261,243 A | 7/1966 | Ellison | |
| 3,596,541 A | 8/1971 | Bieganski | |
| 3,812,859 A | 5/1974 | Murphy et al. | |
| 3,884,100 A | 5/1975 | Fideldy | |
| 3,981,209 A | 9/1976 | Caroff | |
| 4,120,303 A | 10/1978 | Villa-Massone et al. | |
| 4,121,591 A | 10/1978 | Hayes | |
| 4,281,657 A | 8/1981 | Ritchey | |
| 4,323,183 A | 4/1982 | Duchin | |
| 4,497,321 A | 2/1985 | Fearing et al. | |
| 4,516,577 A | 5/1985 | Scott et al. | |
| 4,531,520 A | 7/1985 | Reggers et al. | |
| 4,552,147 A | 11/1985 | Gardner | |
| 4,618,861 A | 10/1986 | Gettens | |
| 4,666,436 A | 5/1987 | McDonald et al. | |
| 4,672,966 A | 6/1987 | Haas, Jr. | |
| 4,696,119 A | 9/1987 | Howe et al. | |
| 4,716,899 A | 1/1988 | Huenefeld et al. | |
| 4,819,639 A | 4/1989 | Gardner | |
| 4,821,683 A | 4/1989 | Veldman | |
| 4,943,294 A | 7/1990 | Knapp | |
| 5,022,253 A | 6/1991 | Parlatore | |
| 5,056,385 A | 10/1991 | Petersen | |
| 5,141,514 A | 8/1992 | van Amelsfort | |
| 5,154,721 A | 10/1992 | Perez | |
| 5,267,464 A | 12/1993 | Cleland | |
| 5,509,291 A | 4/1996 | Nilsson et al. | |
| 5,651,791 A | 7/1997 | Zavlodaver et al. | |
| 5,771,837 A | 6/1998 | van der Lely | |
| 5,778,820 A | 7/1998 | van der Lely et al. | |
| 6,007,548 A | 12/1999 | Ritchey | |
| 6,016,769 A | 1/2000 | Forster | |
| 6,043,748 A | 3/2000 | Touchton et al. | |
| 6,053,926 A | 4/2000 | Luehrs | |
| 6,095,915 A | 8/2000 | Battista et al. | |
| 6,099,482 A | 8/2000 | Brune et al. | |
| 6,100,804 A | 8/2000 | Brady et al. | |
| 6,113,539 A | 9/2000 | Ridenour | |
| 6,113,569 A | 9/2000 | Ridenour | |
| 6,114,957 A | 9/2000 | Westrick et al. | |
| 6,145,225 A | 11/2000 | Ritchey | |
| 6,166,643 A | 12/2000 | Janning et al. | |
| 6,172,640 B1 | 1/2001 | Durst et al. | |
| 6,232,880 B1 | 5/2001 | Anderson et al. | |
| 6,235,036 B1 | 5/2001 | Gardner et al. | |
| 6,271,757 B1 | 8/2001 | Touchton et al. | |
| 6,297,739 B1 | 10/2001 | Small | |
| 6,310,553 B1 | 10/2001 | Dance | |
| 6,402,692 B1 | 6/2002 | Morford | |
| 6,497,197 B1 | 12/2002 | Huisma | |
| 6,502,060 B1 | 12/2002 | Christian | |
| 6,510,630 B1 | 1/2003 | Gardner | |
| 6,516,744 B1 | 2/2003 | Bjork | |
| 6,535,131 B1 | 3/2003 | Bar-Shalom et al. | |
| 6,569,092 B1 | 5/2003 | Booker | |
| 6,659,039 B1 | 12/2003 | Larsen | |
| 6,868,804 B1 | 3/2005 | Huisma et al. | |
| 7,016,730 B2 | 3/2006 | Ternes | |
| 7,046,152 B1 | 5/2006 | Peinetti et al. | |
| 7,137,359 B1 | 11/2006 | Braden | |
| 7,296,539 B2 | 11/2007 | Iljas | |
| 7,380,518 B2 | 6/2008 | Kates | |
| 7,705,736 B1 | 4/2010 | Kedziora | |
| 7,721,675 B2 | 5/2010 | Kaever | |
| 7,772,979 B2 | 8/2010 | Nehls | |
| 7,843,350 B2 | 11/2010 | Geissler et al. | |
| 7,937,861 B1 | 5/2011 | Zacher | |
| 8,005,624 B1 | 8/2011 | Starr | |
| 8,266,990 B1 | 9/2012 | Janson | |
| 8,305,220 B2 | 11/2012 | Gibson | |
| 8,478,389 B1 | 7/2013 | Brockway et al. | |
| 8,622,929 B2 | 1/2014 | Wilson et al. | |
| 8,763,557 B2 | 7/2014 | Lipscomb et al. | |
| 8,939,111 B2 | 1/2015 | Berntsen | |
| 8,950,357 B2 | 2/2015 | Rajkondawar | |
| 8,955,462 B1 | 2/2015 | Golden et al. | |
| 9,215,862 B2 | 12/2015 | Bladen et al. | |
| 9,392,767 B2 | 7/2016 | Johnson, III et al. | |
| 9,392,946 B1 | 7/2016 | Sarantos et al. | |
| 9,449,487 B1 | 9/2016 | Spitalny | |
| 9,603,342 B2 | 3/2017 | Rajkondawar | |
| 9,648,849 B1 | 5/2017 | Vivathana | |
| 9,654,925 B1 | 5/2017 | Solinsky et al. | |
| 9,693,536 B1 | 7/2017 | Dana | |
| 9,717,216 B1 | 8/2017 | Schlachta et al. | |
| 9,743,643 B1 | 8/2017 | Kaplan et al. | |
| 9,848,577 B1 | 12/2017 | Brandao et al. | |
| 9,861,080 B1 | 1/2018 | Hathway et al. | |
| 10,004,204 B2 | 6/2018 | Hayes et al. | |
| 10,021,857 B2 | 7/2018 | Bailey et al. | |
| 10,039,263 B2 | 8/2018 | Teychene et al. | |
| 10,039,267 B1 * | 8/2018 | Thiex | G06Q 10/087 |
| 10,045,511 B1 | 8/2018 | Yarden et al. | |
| 10,064,391 B1 | 9/2018 | Riley | |
| 10,091,972 B1 | 10/2018 | Jensen et al. | |
| 10,231,442 B1 | 3/2019 | Chang et al. | |
| 10,242,547 B1 | 3/2019 | Struhsaker et al. | |
| 10,264,762 B1 | 4/2019 | Lamb | |
| 10,352,759 B1 | 7/2019 | Jensen | |
| 10,446,006 B1 | 10/2019 | Johnson, Jr. et al. | |
| 10,512,430 B1 | 12/2019 | Hladio | |
| 10,588,295 B1 | 3/2020 | Riley | |
| 10,628,756 B1 | 4/2020 | Kuper et al. | |
| 10,638,726 B1 | 5/2020 | Makarychev et al. | |
| 10,691,674 B2 | 6/2020 | Leong et al. | |
| 11,832,584 B2 * | 12/2023 | Wooten | A01K 15/023 |
| 2001/0027751 A1 | 10/2001 | Van den Berg | |
| 2002/0010390 A1 | 1/2002 | Guice et al. | |
| 2002/0021219 A1 | 2/2002 | Edwards | |
| 2002/0050248 A1 | 5/2002 | Pratt | |
| 2002/0091326 A1 | 7/2002 | Hashimoto et al. | |
| 2002/0095828 A1 | 7/2002 | Koopman et al. | |
| 2002/0154015 A1 | 10/2002 | Hixson | |
| 2002/0158765 A1 | 10/2002 | Pape et al. | |
| 2003/0004652 A1 | 1/2003 | Brunner et al. | |
| 2003/0023517 A1 | 1/2003 | Marsh et al. | |
| 2003/0062001 A1 | 4/2003 | Hakan | |
| 2003/0066491 A1 | 4/2003 | Stampe | |
| 2003/0144926 A1 | 7/2003 | Bodin et al. | |
| 2003/0146284 A1 | 8/2003 | Schmit et al. | |
| 2003/0149526 A1 | 8/2003 | Zhou et al. | |
| 2003/0154925 A1 | 8/2003 | Van Den Berg | |
| 2003/0177025 A1 | 9/2003 | Curkendall et al. | |
| 2003/0201931 A1 | 10/2003 | Durst et al. | |
| 2003/0208157 A1 | 11/2003 | Eidson et al. | |
| 2003/0221343 A1 | 12/2003 | Volk et al. | |
| 2003/0229452 A1 | 12/2003 | Lewis et al. | |
| 2004/0066298 A1 | 4/2004 | Schmitt et al. | |
| 2004/0078390 A1 | 4/2004 | Saunders | |
| 2004/0118920 A1 | 6/2004 | He | |

(56)        References Cited

U.S. PATENT DOCUMENTS

| | | |
|---|---|---|
| 2004/0123810 A1 | 7/2004 | Lorton et al. |
| 2004/0177011 A1 | 9/2004 | Ramsay et al. |
| 2004/0201454 A1 | 10/2004 | Waterhouse et al. |
| 2004/0244699 A1 | 12/2004 | Schwering |
| 2005/0010333 A1 | 1/2005 | Lorton et al. |
| 2005/0026181 A1 | 2/2005 | Davis et al. |
| 2005/0097997 A1 | 5/2005 | Hile |
| 2005/0108912 A1 | 5/2005 | Bekker |
| 2005/0115508 A1 | 6/2005 | Little |
| 2005/0126498 A1 | 6/2005 | Bosma |
| 2005/0128086 A1 | 6/2005 | Brown et al. |
| 2005/0139168 A1 | 6/2005 | Light et al. |
| 2005/0145187 A1 | 7/2005 | Gray |
| 2005/0223997 A1 | 10/2005 | Umegard |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser |
| 2006/0117619 A1 | 6/2006 | Costantini |
| 2006/0155172 A1 | 7/2006 | Rugg |
| 2006/0170561 A1 | 8/2006 | Eyal |
| 2006/0173367 A1 | 8/2006 | Stuart et al. |
| 2006/0185605 A1 | 8/2006 | Renz et al. |
| 2006/0201432 A1 | 9/2006 | Pratt |
| 2006/0201436 A1 | 9/2006 | Kates |
| 2006/0207515 A1 | 9/2006 | Palett et al. |
| 2006/0241521 A1 | 10/2006 | Cohen |
| 2006/0254523 A1 | 11/2006 | Guo |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost et al. |
| 2007/0021660 A1 | 1/2007 | Delonzor et al. |
| 2007/0027375 A1 | 2/2007 | Melker et al. |
| 2007/0027377 A1 | 2/2007 | Delonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0193521 A1 | 8/2007 | Alveby |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson et al. |
| 2008/0146890 A1 | 6/2008 | LeBoeuf et al. |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2008/0314325 A1 | 12/2008 | Hempstead |
| 2009/0009388 A1 | 1/2009 | Wangrud |
| 2009/0020613 A1 | 1/2009 | Chang et al. |
| 2009/0025651 A1 | 1/2009 | Lalor |
| 2009/0058730 A1 | 3/2009 | Geissler et al. |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0255484 A1 | 10/2009 | Muelken |
| 2009/0312667 A1 | 12/2009 | Utsunomiya et al. |
| 2010/0018363 A1 | 1/2010 | Chervenak et al. |
| 2010/0027845 A1 | 2/2010 | Kim |
| 2010/0030036 A1 | 2/2010 | Mottram et al. |
| 2010/0045468 A1 | 2/2010 | Geissler |
| 2010/0107985 A1 | 5/2010 | O'Hare |
| 2010/0113902 A1 | 5/2010 | Hete et al. |
| 2010/0116211 A1 | 5/2010 | Sundborger |
| 2010/0139575 A1 | 6/2010 | Duncan et al. |
| 2010/0147221 A1 | 6/2010 | Holscher |
| 2010/0154722 A1 | 6/2010 | Van Den Berg |
| 2010/0160809 A1 | 6/2010 | Laurence et al. |
| 2010/0175625 A1 | 7/2010 | Klenotiz et al. |
| 2010/0217102 A1 | 8/2010 | LeBoeuf et al. |
| 2010/0250198 A1 | 9/2010 | Lorton et al. |
| 2010/0289639 A1 | 11/2010 | Gibson et al. |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Maltz et al. |
| 2011/0018717 A1 | 1/2011 | Takahashi et al. |
| 2011/0041367 A1 | 2/2011 | Bladen et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0166793 A1 | 7/2011 | March et al. |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete |
| 2012/0009943 A1 | 1/2012 | Greenberg et al. |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0234245 A1 | 9/2012 | Rajkondawar et al. |
| 2012/0236690 A1 | 9/2012 | Rader et al. |
| 2012/0291715 A1 | 11/2012 | Jiang et al. |
| 2012/0299731 A1 | 11/2012 | Triener |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0008391 A1 | 1/2013 | Berntsen |
| 2013/0014706 A1 | 1/2013 | Menkes |
| 2013/0046170 A1 | 2/2013 | Haynes |
| 2013/0098295 A1 | 4/2013 | Mulder |
| 2013/0113622 A1 | 5/2013 | Pratt et al. |
| 2013/0119142 A1 | 5/2013 | Mccoy et al. |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0285815 A1 | 10/2013 | Jones, II |

(56)  References Cited

U.S. PATENT DOCUMENTS

| | | |
|---|---|---|
| 2014/0073486 A1 | 3/2014 | Ahmed et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | Mclaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0109130 A1 | 4/2015 | Rajkondawar et al. |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | LeBoeuf et al. |
| 2016/0135431 A1 | 5/2016 | Siegel |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280675 A1 | 10/2017 | MacNeil et al. |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0027772 A1 | 2/2018 | Gordon et al. |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0113498 A1 | 4/2018 | Cronin et al. |
| 2018/0131074 A1 | 5/2018 | Wilkinson et al. |
| 2018/0132455 A1 | 5/2018 | Pradeep et al. |
| 2018/0146645 A1 | 5/2018 | Arbel |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco et al. |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0183091 A1 | 6/2019 | Betts-Lacroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2020/0015740 A1 | 1/2020 | Alnofeli et al. |
| 2020/0029534 A1 | 1/2020 | Austin et al. |
| 2020/0037886 A1 | 2/2020 | Greer et al. |

(56)        References Cited

U.S. PATENT DOCUMENTS

| | | | |
|---|---|---|---|
| 2020/0068853 | A1 | 3/2020 | Radovcic |
| 2020/0085019 | A1 | 3/2020 | Gilbert et al. |
| 2020/0100463 | A1 | 4/2020 | Rooda et al. |
| 2020/0107522 | A1 | 4/2020 | Kersey et al. |
| 2020/0110946 | A1 | 4/2020 | Kline et al. |
| 2020/0113728 | A1 | 4/2020 | Spector et al. |
| 2020/0170222 | A1 | 6/2020 | Gotts |
| 2020/0178505 | A1 | 6/2020 | Womble et al. |
| 2020/0178800 | A1 | 6/2020 | Geissler et al. |
| 2020/0205381 | A1 | 7/2020 | Wernimont et al. |
| 2020/0229391 | A1 | 7/2020 | De Groot |
| 2020/0229707 | A1 | 7/2020 | Donnelly |
| 2020/0242551 | A1 | 7/2020 | Lau et al. |
| 2022/0020051 | A1 | 1/2022 | Aruga et al. |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 B2 | 7/2015 |
| AU | 2016266101 | 12/2016 |
| AU | 2017100469 | 5/2017 |
| AU | 2018220079 | 9/2018 |
| AU | 2019261293 A1 | 12/2020 |
| BR | 8701673 | 3/2009 |
| BR | 112012018909 | 1/2011 |
| CA | 2267812 | 10/2000 |
| CA | 2493331 | 1/2005 |
| CA | 2788153 | 8/2011 |
| CA | 2880138 | 2/2013 |
| CA | 2875637 | 1/2014 |
| CA | 2875578 | 12/2014 |
| CA | 2915843 | 12/2014 |
| CA | 2990620 | 12/2016 |
| CA | 2858905 C | 4/2017 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 A | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 202013011075 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 A1 | 4/2008 |
| EP | 1961294 | 8/2008 |
| EP | 2028931 | 3/2009 |
| EP | 2172878 | 4/2010 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 A1 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |

(56)　　　　　References Cited

FOREIGN PATENT DOCUMENTS

| | | |
|---|---|---|
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2469326 | 10/2010 |
| GB | 2554636 | 9/2016 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 2011067178 | 4/2011 |
| JP | 2011087657 | 5/2011 |
| JP | 2013247941 | 6/2012 |
| JP | 5659243 B2 | 1/2015 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 101747418 | 1/2011 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| NZ | 751839 B2 | 1/2022 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000013393 | 3/2000 |
| WO | 2000061802 | 10/2000 |
| WO | 2001004858 A1 | 1/2001 |
| WO | 2001033950 | 5/2001 |
| WO | 2001087054 | 11/2001 |
| WO | 0193667 A1 | 12/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005104930 | 4/2005 |
| WO | 2005073408 | 8/2005 |
| WO | 2005082132 A2 | 9/2005 |
| WO | 2006021855 | 3/2006 |
| WO | 2006022548 A1 | 3/2006 |
| WO | 20060036567 A1 | 4/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 2008033042 A2 | 3/2008 |
| WO | 2008041839 A1 | 4/2008 |
| WO | 2019048521 A1 | 4/2008 |
| WO | 2008052298 | 5/2008 |
| WO | 2008075974 | 6/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014030156 A1 | 2/2014 |
| WO | 2014055005 A1 | 4/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |
| WO | 2015160263 A1 | 10/2015 |

(56) References Cited

FOREIGN PATENT DOCUMENTS

| | | |
|---|---|---|
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |
| WO | 2016108187 | 7/2016 |
| WO | 2016166748 | 10/2016 |
| WO | 2017001538 | 1/2017 |
| WO | 2017027551 | 2/2017 |
| WO | 2017037479 | 3/2017 |
| WO | 2017066813 | 4/2017 |
| WO | 2017089289 | 6/2017 |
| WO | 2017096256 | 6/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018152593 A1 | 8/2018 |
| WO | 2018172976 | 9/2018 |
| WO | 2020060248 | 9/2018 |
| WO | 2018203203 | 11/2018 |
| WO | 2019009717 | 1/2019 |
| WO | 2019025138 | 2/2019 |
| WO | 2019040721 A2 | 2/2019 |
| WO | 2019046216 | 3/2019 |
| WO | 2019058752 | 3/2019 |
| WO | 2019071222 | 4/2019 |
| WO | 2019132803 | 7/2019 |
| WO | 2019207561 | 10/2019 |
| WO | 2019226100 A1 | 11/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, The Journal of Dairy Research; Cambridge vol. 84, Iss. 2, (May 2017): 132-138.

Clark, C., Lyons, N., Millapan, L., Talukder, S., Cronin, G., Kerrisk, K., Garcia, S. (2015), Rumination and activity levels as predictors of calving for dairy cows, Animal, 9(4), 691-695.

K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.

L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.

S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.

N. Soriani, E. Trevisi, L Calamari, Relationships between rumination time, metabolic conditions, and health status in dairy cows during the transition period, Journal of Animal Science, vol. 90, Issue 12, Dec. 2012, pp. 4544-4554.

The role of sensors, big data and machine learning in modern animal farming; Suresh Neethirajan; Accepted Jul. 3, 2020 Sensing and Bio-Sensing Research 29 (2020) 100367 2214-1804/ © 2020 The Author. Published by Elsevier B.V.

A Review on Determination of Computer Aid Diagnosis and/or Risk Factors Using Data Mining Methods in Veterinary Field Pınar Cİhan, Erhan Gökçe, Oya Kalipsiz; Tekirdağ Namık Kemal University, Çorlu Faculty of Engineering, Department of Computer Engineering, Tekirdağ, Turkey. 2019.

Big Data Analytics and Precision Animal Agriculture Symposium: Data to decisions B. J. White, D. E. Amrine, and R. L. Larson Beef Cattle Institute, Kansas State University, Manhattan, KS; © The Author(s) 2018. Published by Oxford University Press on behalf of American Society of Animal Science.

Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.

Drying up Cows and the Effect of Different Methods Upon Milk Production; Ralph Wayne, C. H. Eckles, and W. E. Peterson; Division of Dairy Husbandry, University of Minnesota, St. Paul; Research-Articlel vol. 16, Issue 1, p. 69-78, Jan. 1, 1933.

* cited by examiner

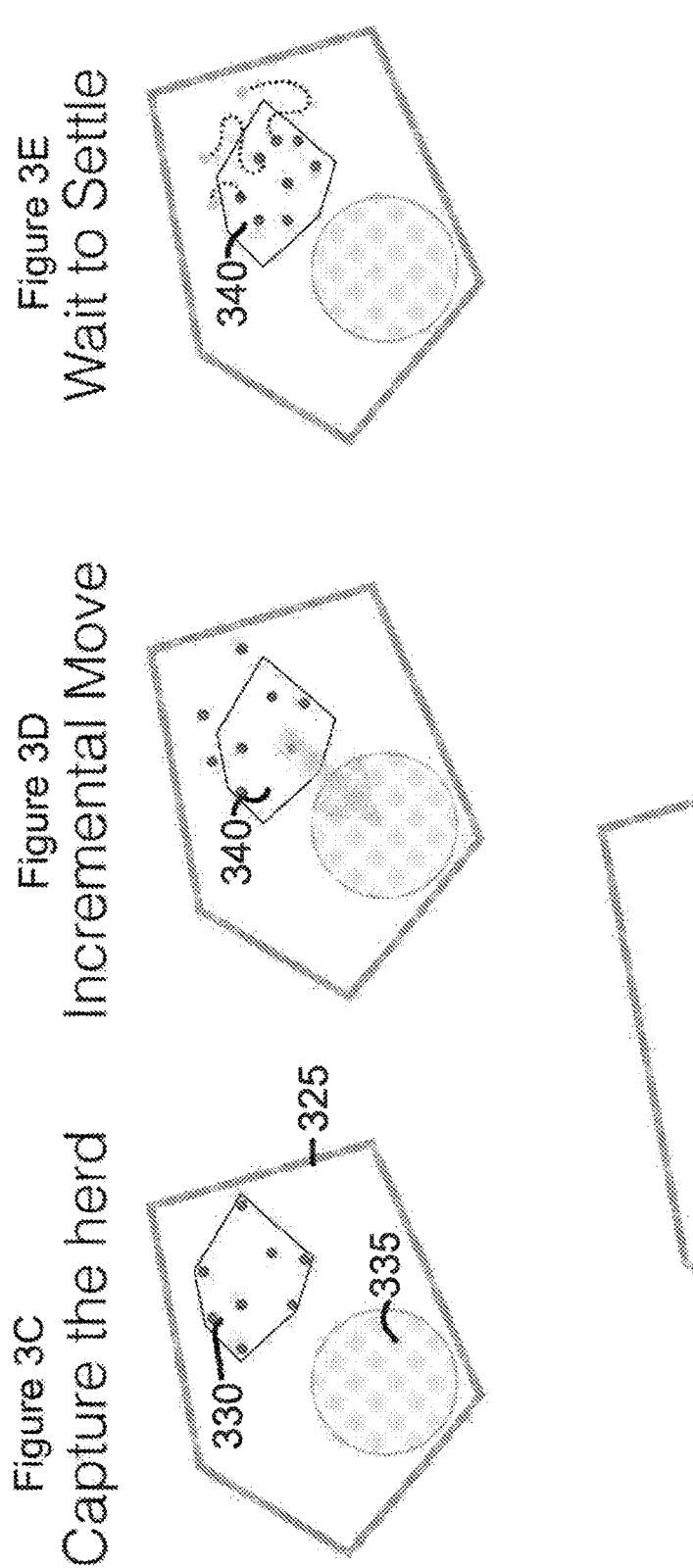
Figure 3C
Capture the herd
Figure 3D
Incremental Move
Figure 3E
Wait to Settle
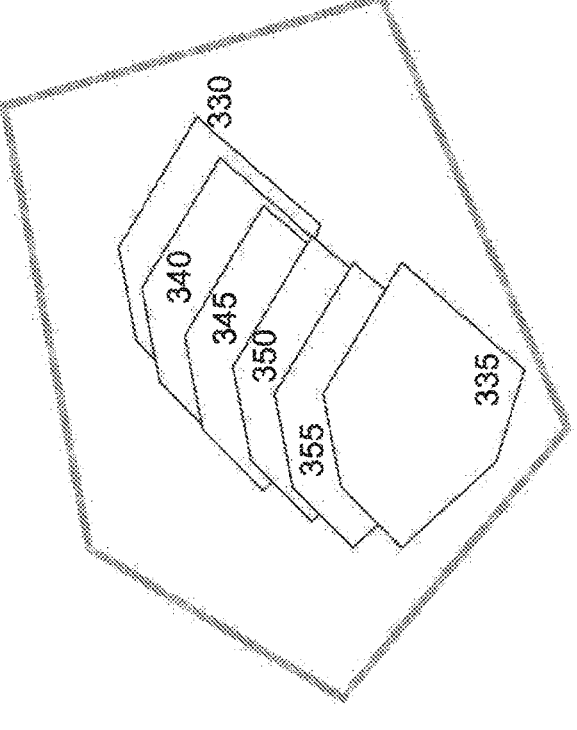
Figure 3F   Using "sequential chaining", incrementally capture-and-guide the herd members

Wakeup Electronics from Sleep
- uController wakeup note 1
- GPS wakeup & initiate tracking note 1

505

Perform Operations:
- Wait for GPS 1st Fix note 2

510

BG_Timer > CR_Tx_Interval?

Yes / No

515

Then:
- Initiate Wireless Tx note 3
- Reset BG_Timer (Background Timer)

520

GPS Position Within Bounds?

Yes / No

Jump to Near_Boundary Function

525

Perform Operations:
- Calculate Sleep_Time Duration
- Send All Electronics into Sleep for determined duration and WAIT note 1 & 4

530

Perform Operations:
- WAIT for accelerometer threshold trip note 5

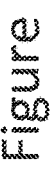

Notes
1. uController & GPS lower power modes will vary as a function of the Sleep_Time (following slide)
2. Duration required for GPS Time To First Fix (TTFF) will be monitored by the Cattle Rider
3. Each Cattle Rider should have a ~unique wireless talk time to the extent practical
4. If GPS 1st fix (TTFF) is taking too long, fresh Ephemeris download is required
5. Potential add on: WAIT until Sleep_Time has expired THEN initiate wakeup only after next accelerometer motion detected interrupt (e.g. to handle cases in which the animal is sleeping)

Core Software Loop – When Animal is Within Bounds

Figure 6A:
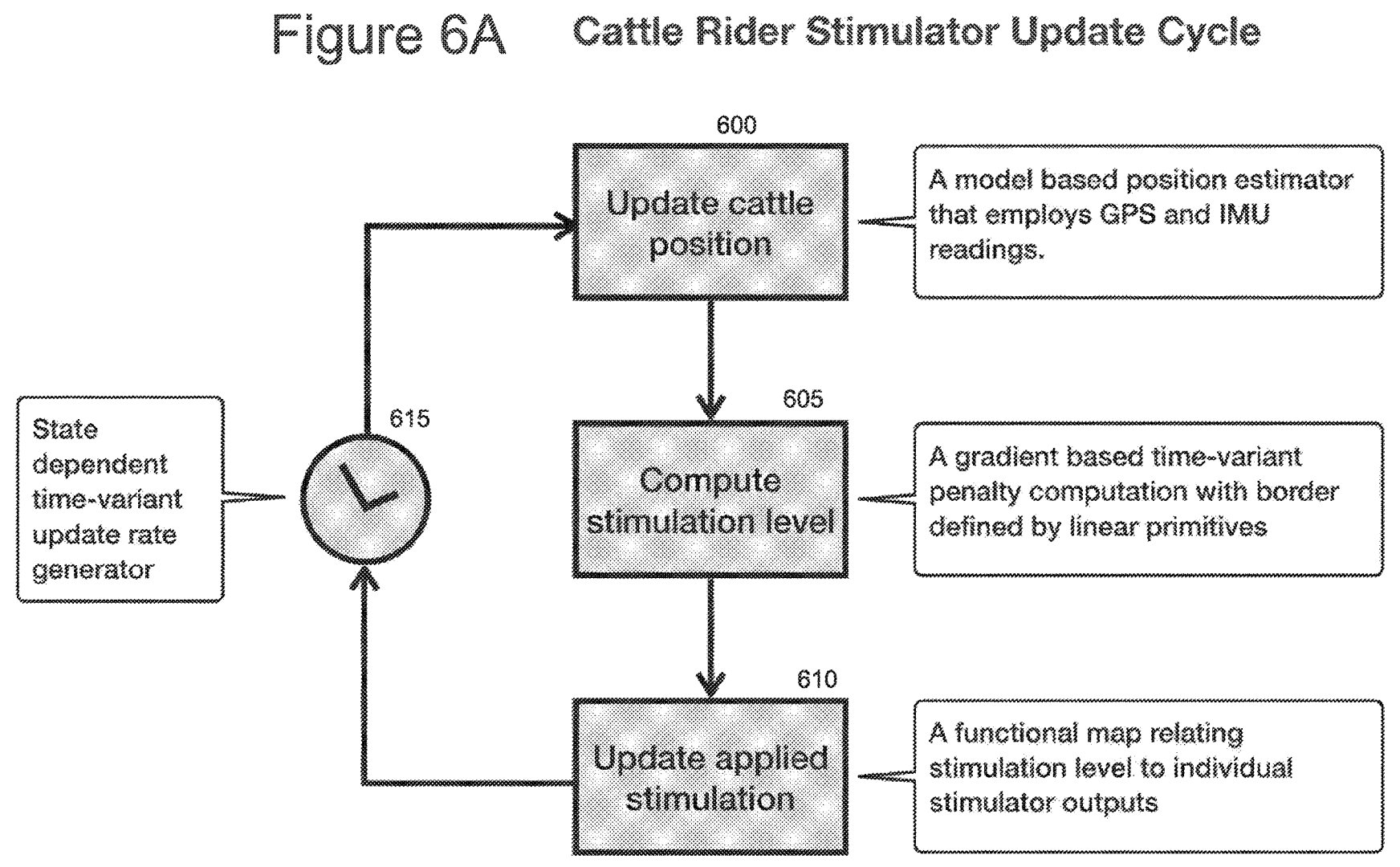

Figure 6A    Cattle Rider Stimulator Update Cycle

A model based position estimator that employs GPS and IMU readings.

A gradient based time-variant penalty computation with border defined by linear primitives A functional map relating stimulation level to individual stimulator outputs

600

Update cattle position

605

Compute stimulation level

610

Update applied stimulation

615

State dependent time-variant update rate generator

Update Cattle Position

Figure 6C

Stimulation Level Computation

Update Applied Stimulation

NOT ALL VERTICES 720
NUMBERED, TO AVOID
CLUTTER off-axis   800 outside off-axis inside outside

815 off-axis

810 inside off-axis outside off-axis inside   805

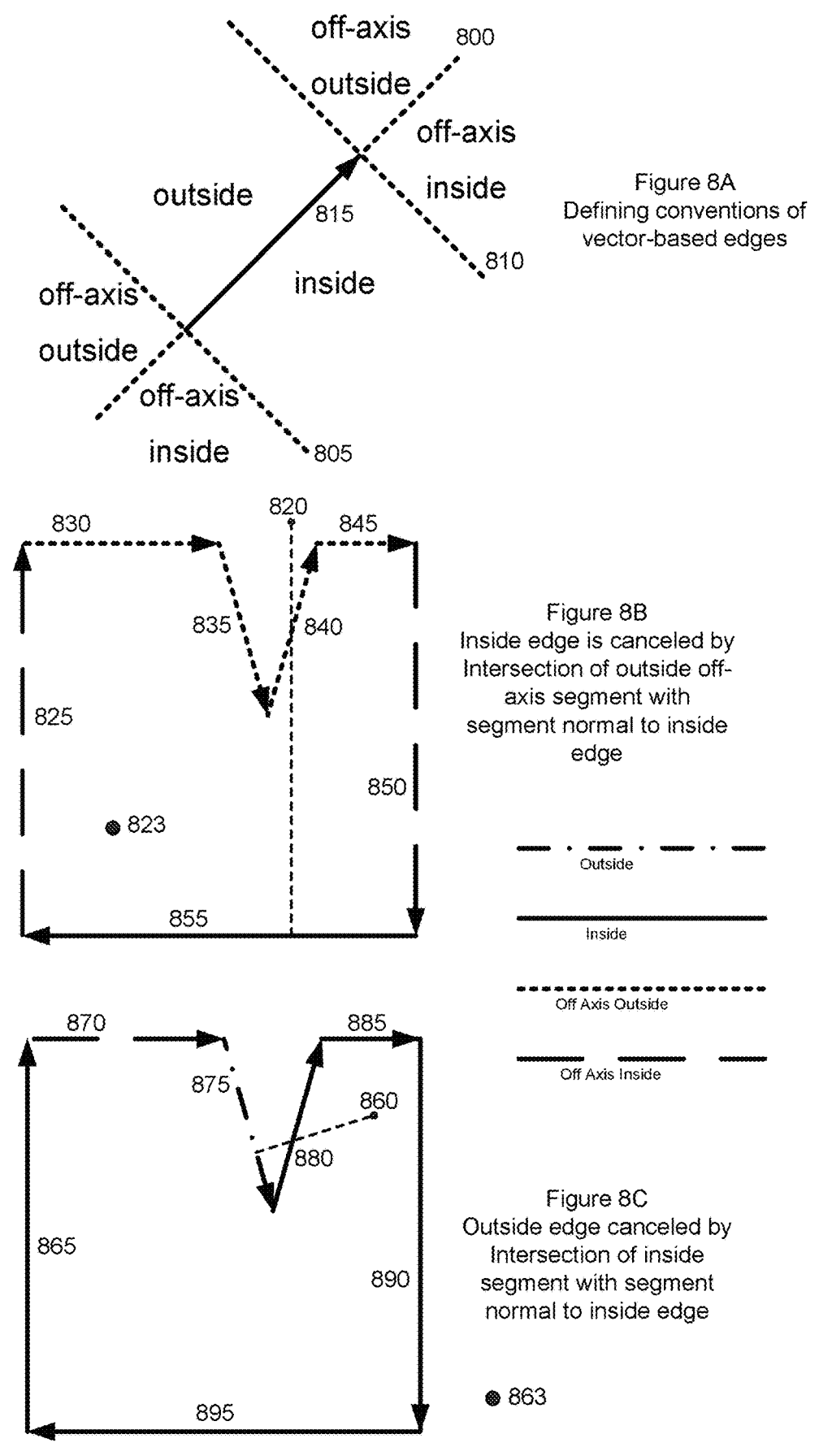

Figure 8A
Defining conventions of
vector-based edges 830    820    845

825

835   840

823

850

855

Figure 8B
Inside edge is canceled by
Intersection of outside off-
axis segment with
segment normal to inside
edge Outside Inside Off Axis Outside Off Axis Inside 870    885

875

860

880

865

890

Figure 8C
Outside edge canceled by
Intersection of inside
segment with segment
normal to inside edge

LIVESTOCK MANAGEMENT SYSTEM AND METHOD

RELATED APPLICATION

The present application claims the benefit of U.S. Provisional Patent Application Ser. No. 62/661,040 filed Apr. 22, 2018 and having the same title as the present application. That application is incorporated herein by reference as though set forth in full.

FIELD OF THE INVENTION

The present invention relates generally to the field of livestock management devices, systems and methods, and more particularly relates to systems and methods for livestock tracking and confinement using animal-worn tags in communication with a network server.

BACKGROUND OF THE INVENTION

Livestock management, such as for cattle, has historically involved nothing more sophisticated that physical fences defining one or more grazing ranges, or paddocks, together with sufficient personnel, animals and machinery to move the livestock from one paddock to another at appropriate times. More recently, ear tags have been used to identify each piece of livestock. Still more recently, the general notion of some form of electronic monitoring of livestock has been proposed, and some form of virtual fencing has also been proposed.

Electrically-charged fences have also been developed to define the perimeter of areas within which animals are free to wander. Also known are wireless collars which shock an animal such as a dog when triggered by a perimeter wire.

Notwithstanding these recent developments in the monitoring and fencing of livestock, many issues remain to be resolved and improved upon. Electric fences cannot be readily moved, and thus, for example, adjusting grazing areas for cattle is not feasible. Even for systems using virtual fences, the capability to encourage animals to stay within the defined area has been ineffective, both in terms of stimulus applied to the animal and the ability to operate autonomously from a central control point. In addition, existing systems have been unable to monitor animal characteristics in a manner that permits learning animal behavior patterns and characterization of animal behavior including health and herd interaction. Further, power requirements have proven extremely challenging for herds that are allowed to roam over substantial distances.

As a result, there has been a need for systems, devices, and methods configured to provide improved livestock management that addresses the above issues, as well as others.

SUMMARY OF THE INVENTION

The present invention substantially addresses many of the shortcomings of the prior art. More specifically, a network server communicates wirelessly, through one or more gateways, with a plurality of animal tags, typically one per animal. A user device, such as a smartphone, tablet, laptop or desktop computer running an application program allows a user to define a paddock in which one or more animals are permitted to graze, together with other instructions for monitoring the behavior of the animals.

The tags monitor the location and various physical characteristics of the animal wearing the tag. In an embodiment, the tags include a processor and memory together with an operating program responsive to instructions received from the network server as well as various sensors incorporated into the tag. The sensors, in an embodiment, comprise GPS, accelerometer, altimeter, magnetometer, thermometer, heart rate monitor, microphone, and low battery. In addition, in at least some embodiments, the tag includes a mechanism responsive to instructions from the tag's processor for stimulating the tagged animal, which can comprise, for example, electric shock, sound feedback, vibration feedback, RF stimulus, thermal stimulus, or other forms suitable for causing a change in behavior of the tagged animal.

In a typical embodiment, the user defines a virtual paddock such as by defining a set of vertices in the form of GPS coordinates. The virtual paddock definition is forwarded to the network server. The network server transmits the paddock boundaries to each of the animal tags, where the defined boundaries are stored. In the event an animal approaches a boundary of the virtual paddock, a stimulus is generated by the tag to cause the animal to change direction and stay within the paddock boundaries. In some embodiments, it can be desirable to define a boundary zone somewhat within the actual boundary, where the stimulus to the animal is initiated, for example at a low initial level, upon entry into the boundary zone, and then increases until the animal's direction changes back toward the central area of the paddock. In some embodiments, a maximum stimulus is applied, and an alert sent to the network server, upon the animal reaching the boundary.

In an embodiment, to ensure good animal welfare, should the animal continue through the boundary and is unable to be turned back toward the central area of the paddock, the stimulus can be discontinued to prevent injury to the animal. In an alternative embodiment, should the animal continue outside the boundary, the stimulus can be turned off for a period of time to de-stress the animal, and then reapplied either continuously, pulsed repetitively, or applied in differing combinations to encourage the animal to return to within the paddock boundary. In still other embodiments, especially in environments with topological dangers, risk of predators, or other environmental concerns that impact the animal's welfare, it may be desirable to maintain application of the stimulus in some form or combination. In each of the above alternatives, the alert sent to the network server can be canceled upon the animal's return to the virtual paddock.

Herds are typically moved from one paddock to another to avoid overgrazing. To that end, the user may also define one or more additional virtual paddocks, together with a schedule for moving the herd from the first virtual paddock to each subsequent virtual paddock. To move the herd from one paddock to the next, a series of incremental virtual paddocks can be automatically defined or based on user input, and the animals within the now old, first virtual paddock are stimulated to move in the direction of the first incremental paddock, then the second, and so on until the animals reach the new virtual paddock. The process then returns to maintaining the animals within the boundaries of the new virtual paddock.

In addition to providing a virtual paddock for herd management, the present invention further includes the ability to monitor overall herd behavior as well as the behavior of specific animals or groups of animals. Thus, various combinations of sensors can be used to identify weight gain, estrus, distress, animal interaction and herd dynamics.

These and other features of the present invention can be better appreciated from the following Detailed Description, taken together with the appended Figures.

THE FIGURES

FIGS. 3A-3F illustrates a paddock defined by a virtual fence in accordance with an embodiment of the invention and incremental moves to relocate a herd from a first paddock to a second.

Figure 4A:
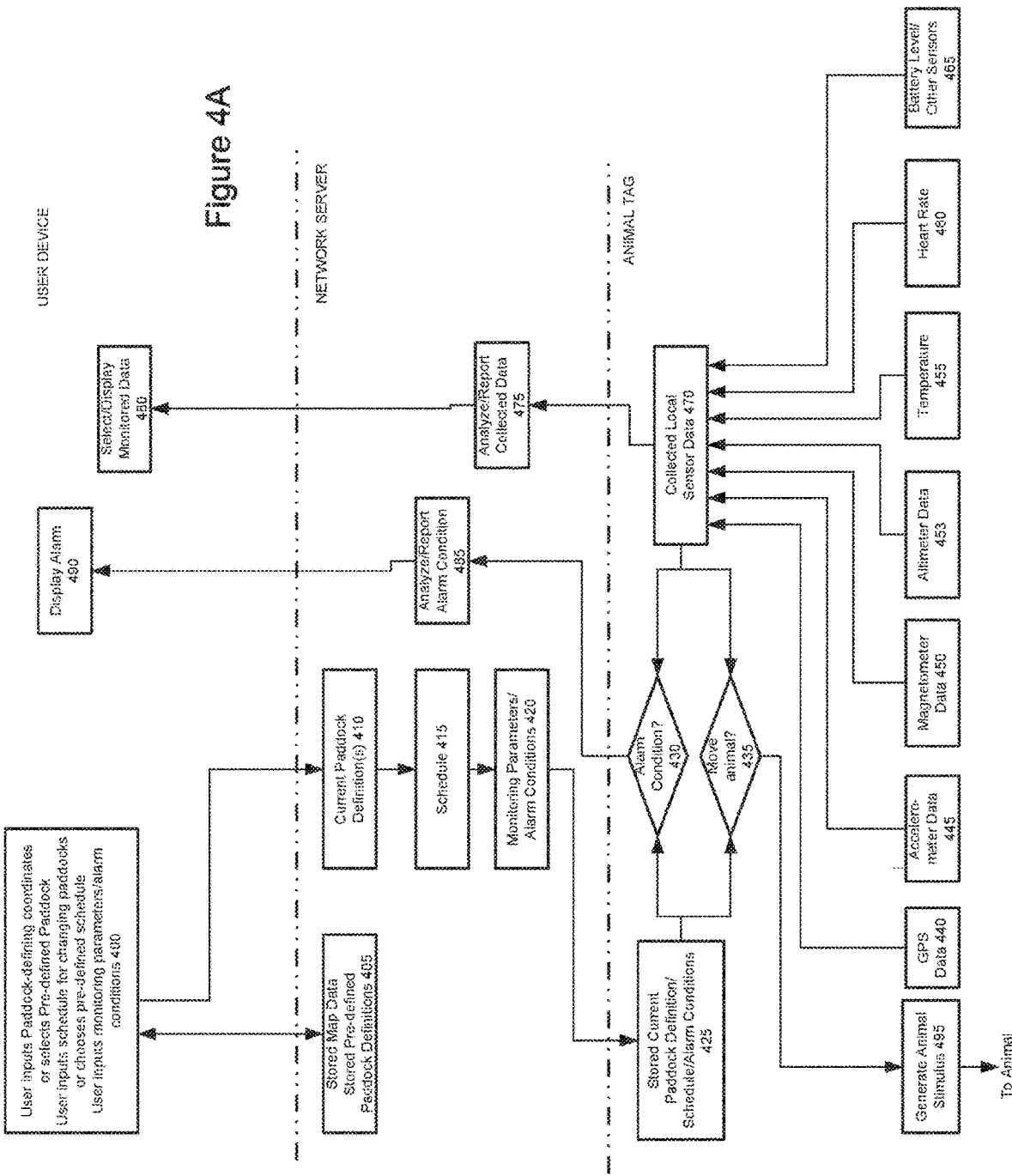

FIG. 4A generally illustrates in flow diagram form the overall software architecture of an embodiment of the system of the present invention.

Figure 2A:
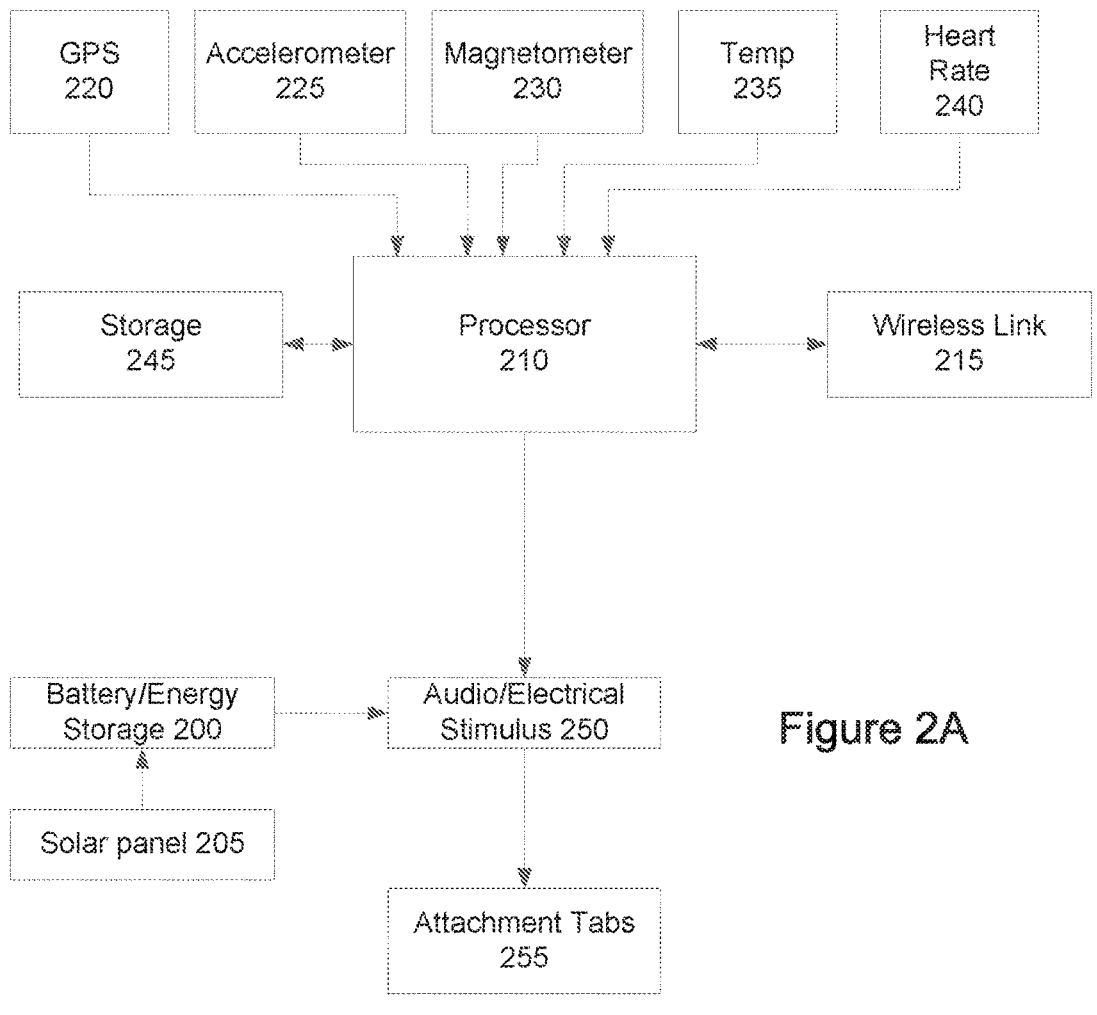
FIG. 2A illustrates in block diagram form an embodiment of the hardware architecture of the animal tag of the present invention.
Figure 2B:
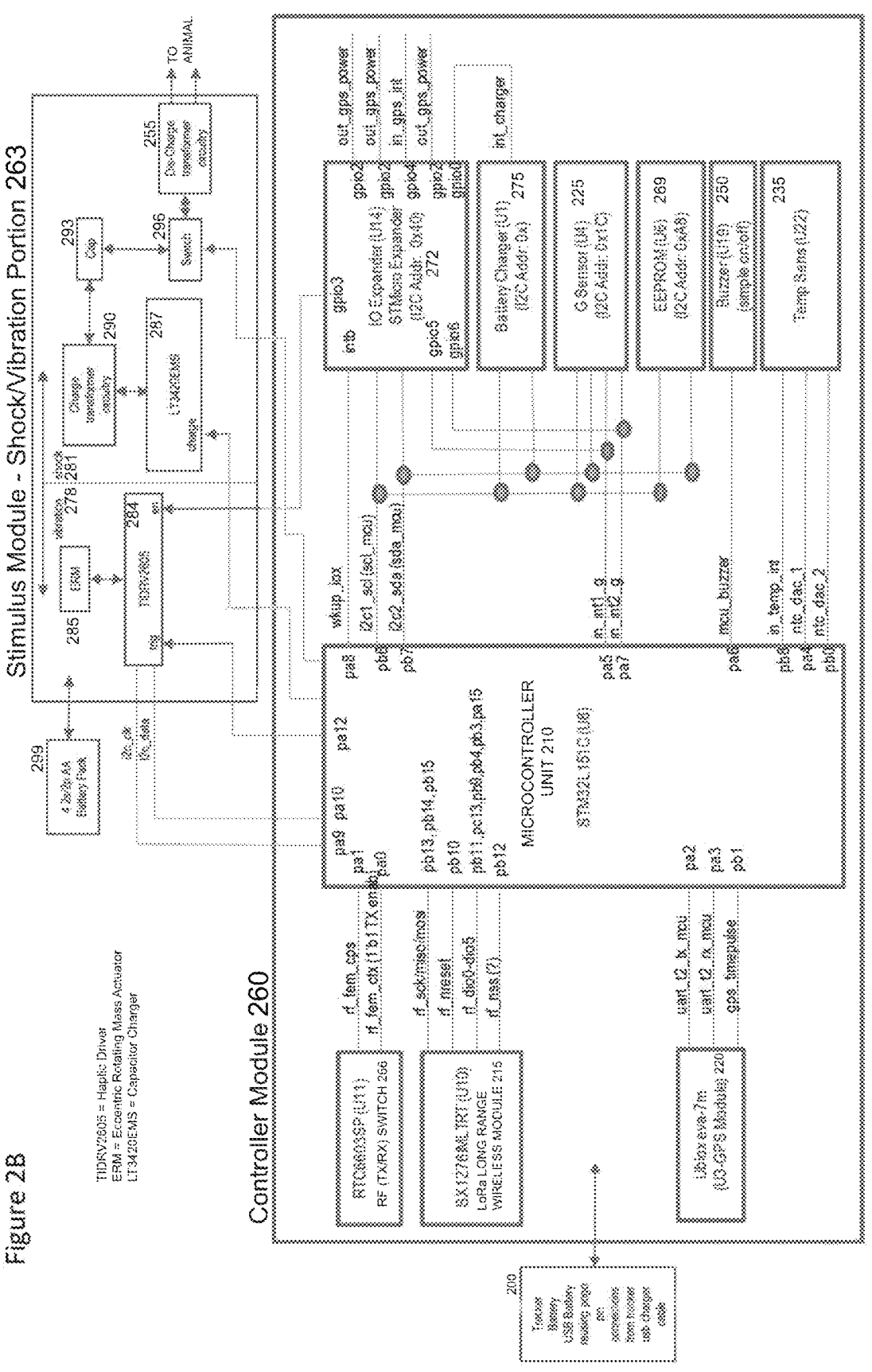
FIG. 2B illustrates in schematic diagram form the hardware architecture of FIG. 2A.
Figure 4B:
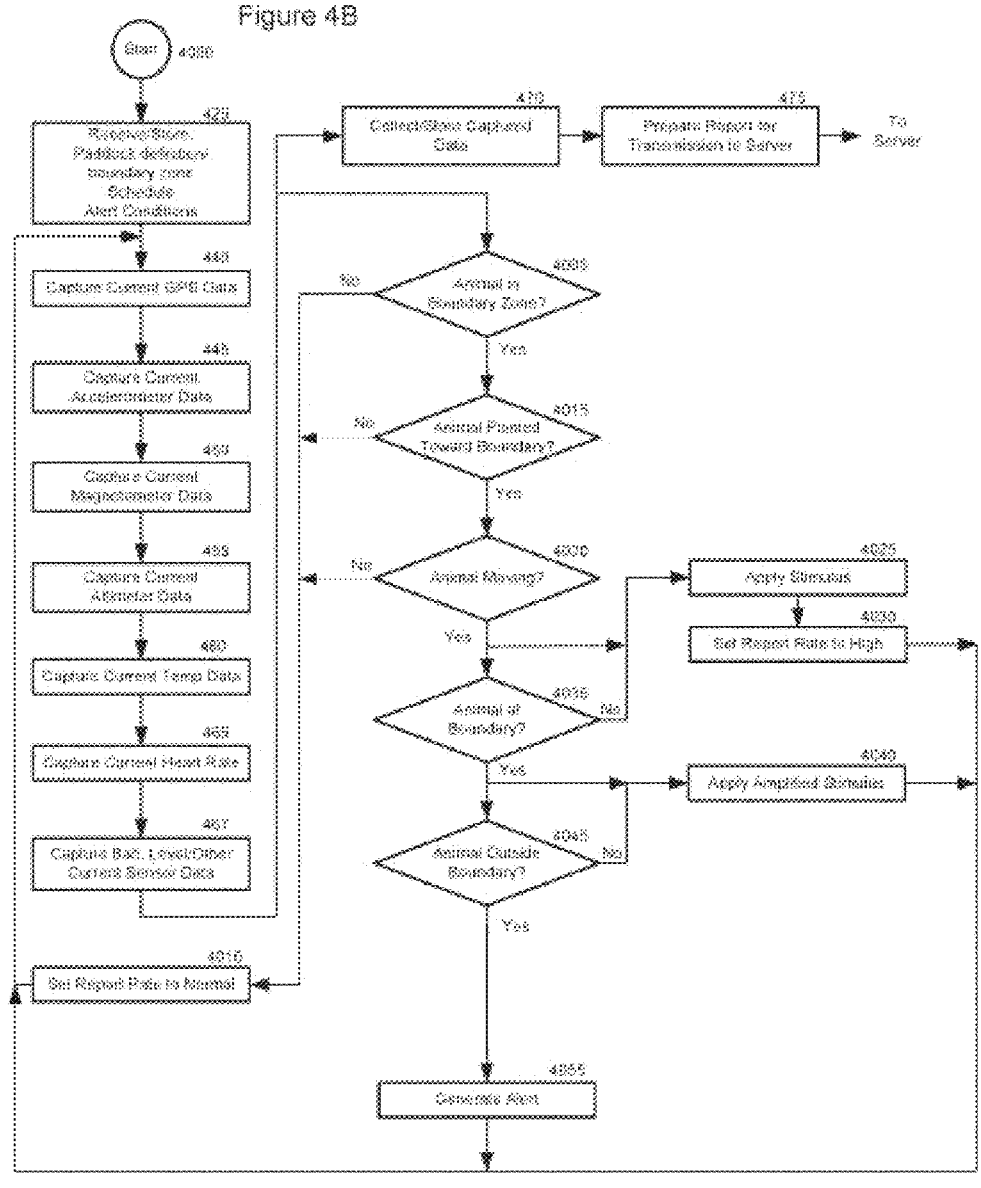

FIG. 4B generally illustrates, in process flow diagram form, an embodiment of the operation of the animal tag of FIG. 2B including storing paddock and related information received from the network, sensing location and other data specific to the particular animal to which the tag is attached, determining whether an alarm condition exists, reporting collected data and/or alarms back to the network, and, if appropriate, stimulating the animal to cause their repositioning.

FIG. 5 illustrates the core software loop of the tag of an embodiment of the invention when the animal is within bounds.

Figure 1A:
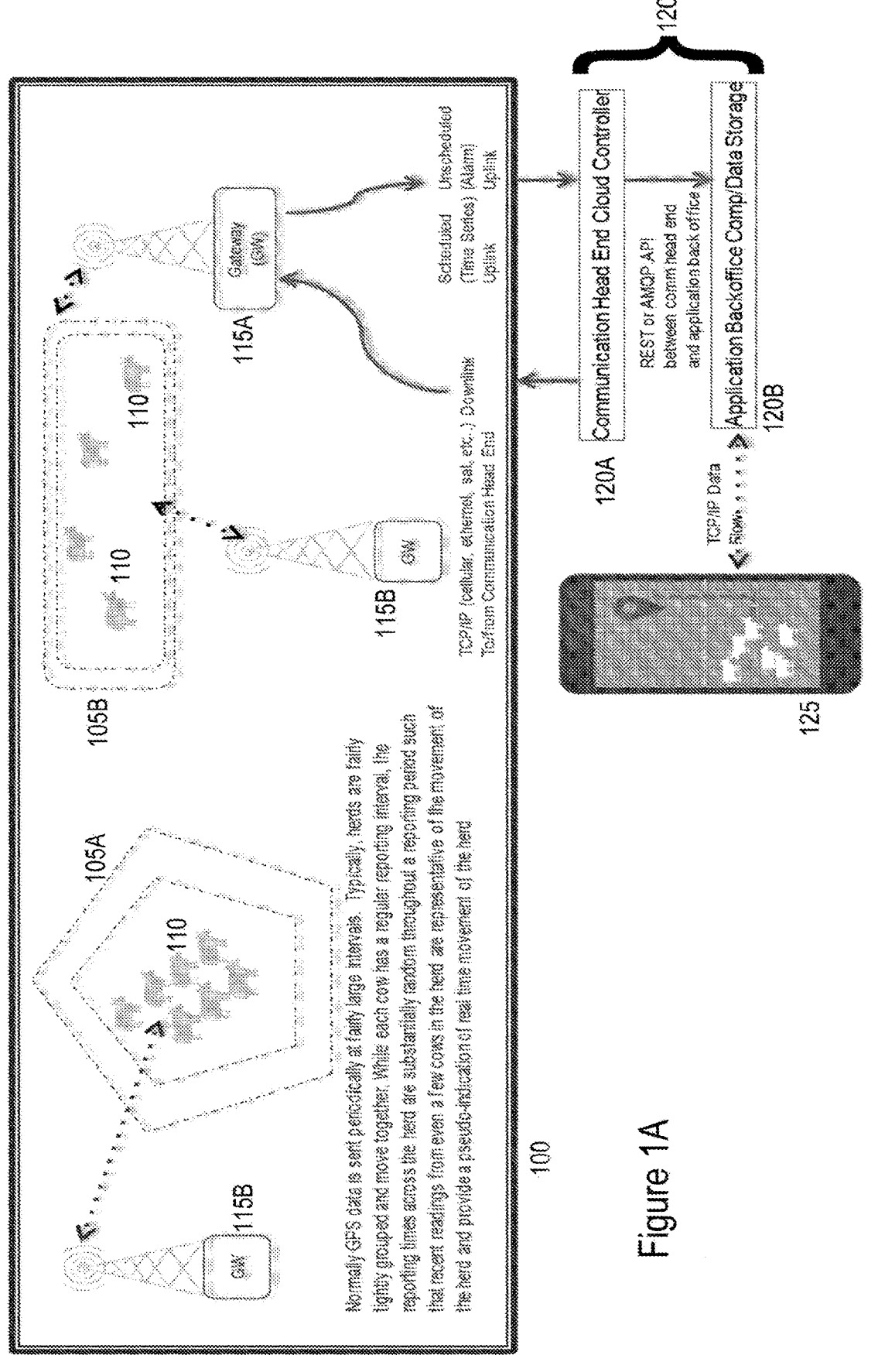
FIG. 1A illustrates in schematic form an exemplary overall view of an embodiment of the livestock management system of the present invention.
Figure 1B:
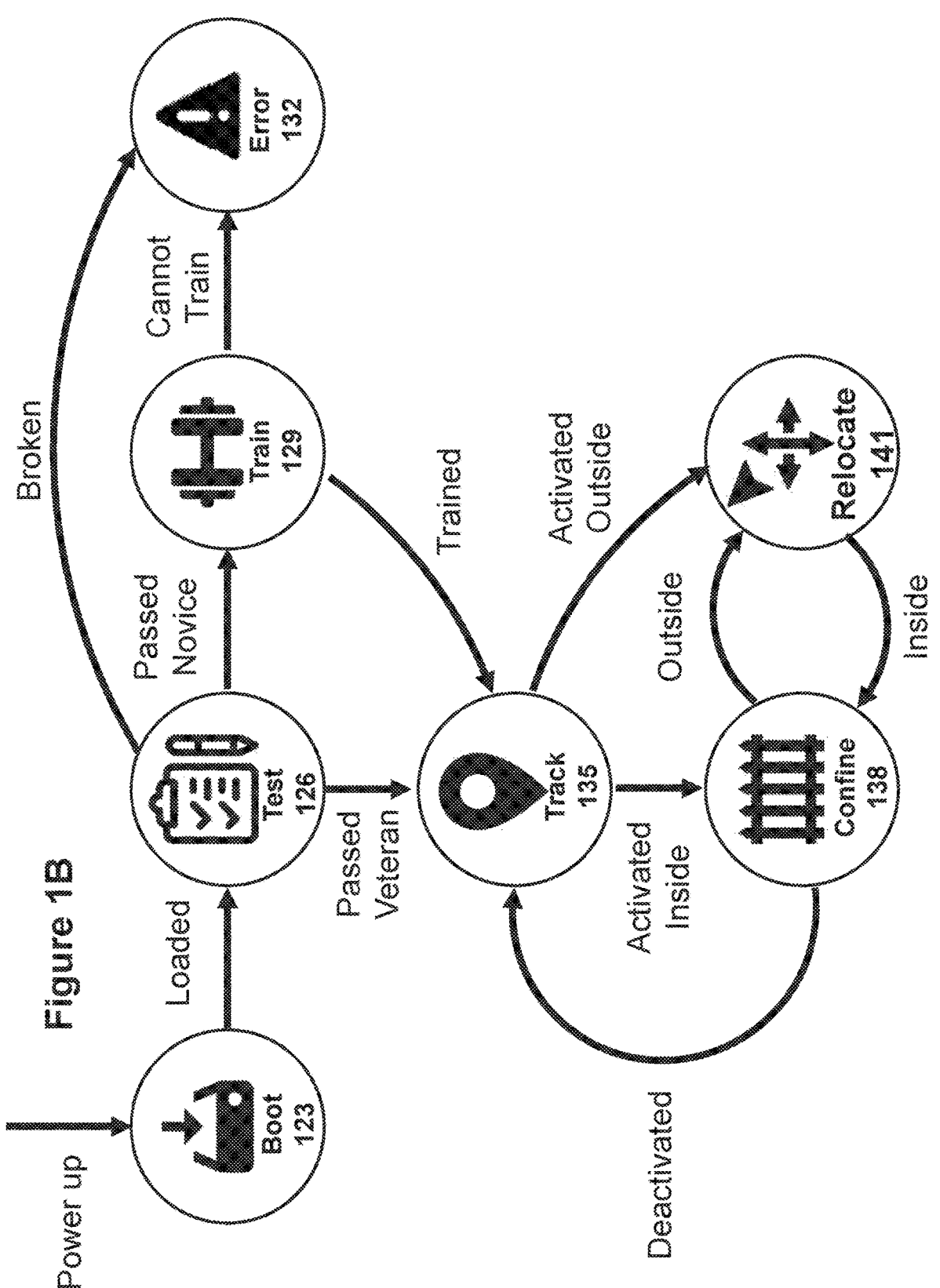
FIG. 1B illustrates in state machine form the various states of the system.
Figure 1C:
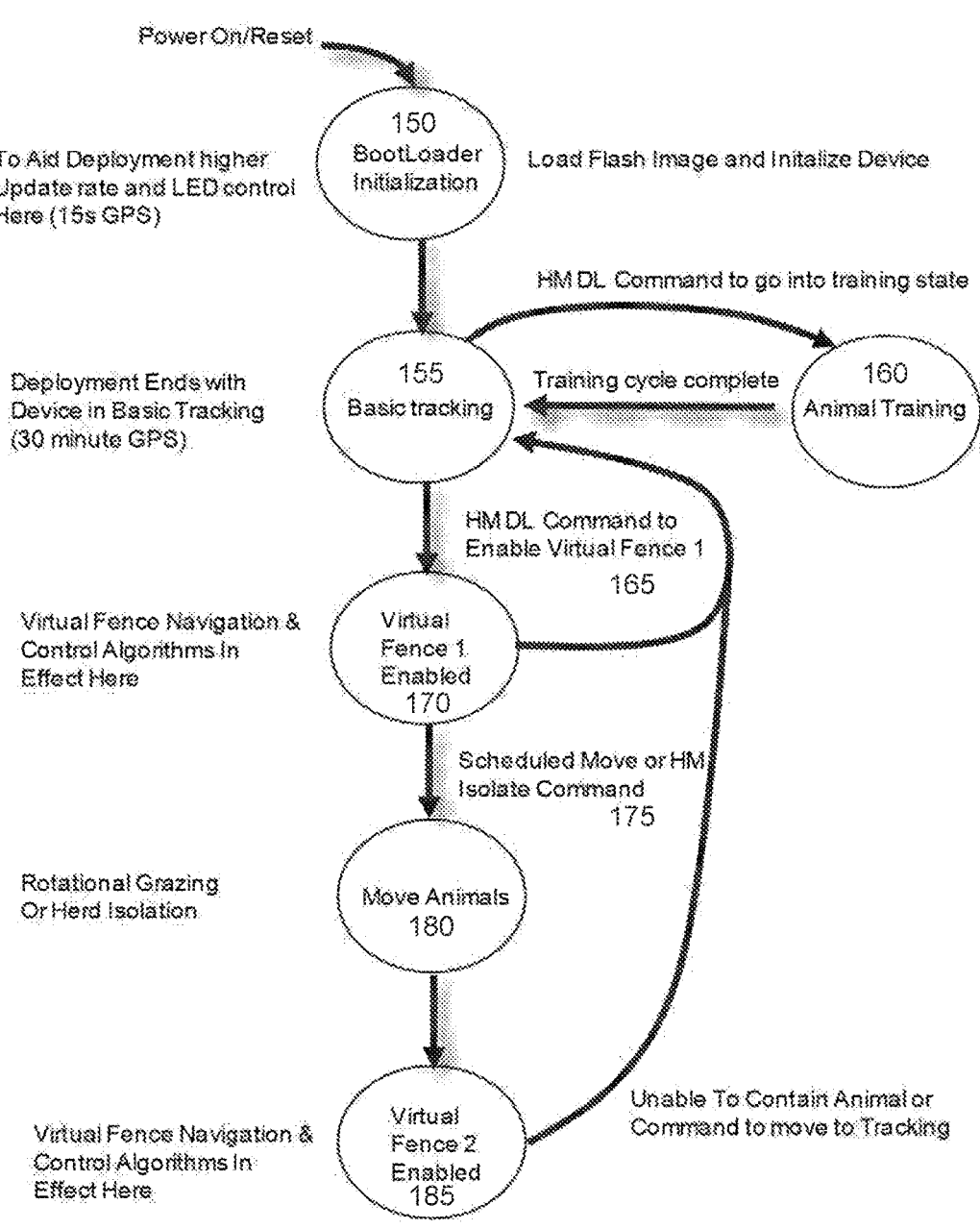
FIG. 1C illustrates in simplified flow diagram form the overall operation of the system.
Figure 1D:
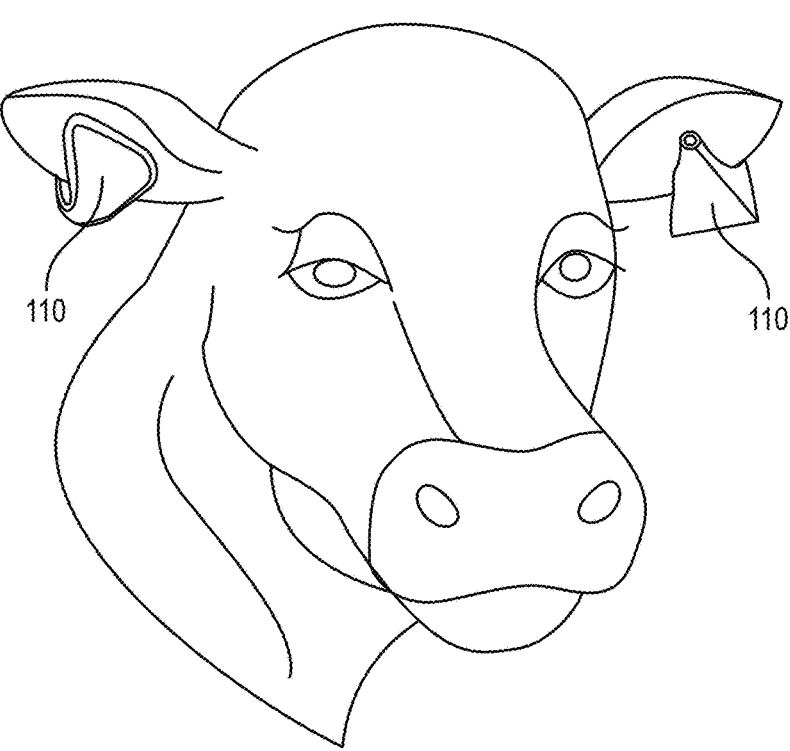
FIG. 1D illustrates an animal tag in accordance with the invention affixed to the ear of a cow.

FIG. 6A illustrates an example of the stimulator update cycle of the tag of FIG. 1D.

Figure 6B:
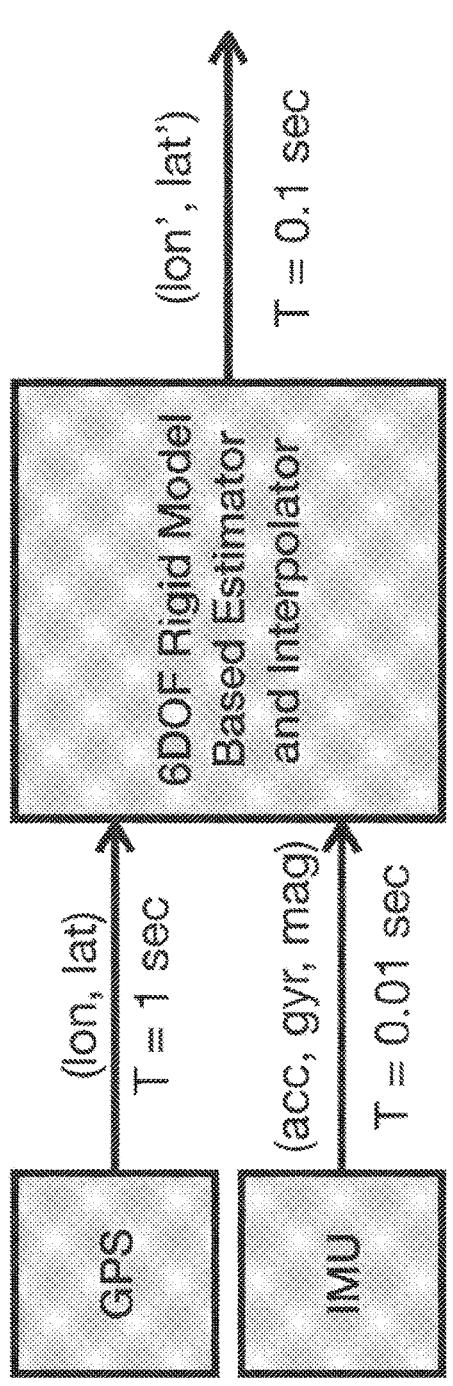

FIG. 6B illustrates an updating of the position of a tagged animal.

Figure 6C:
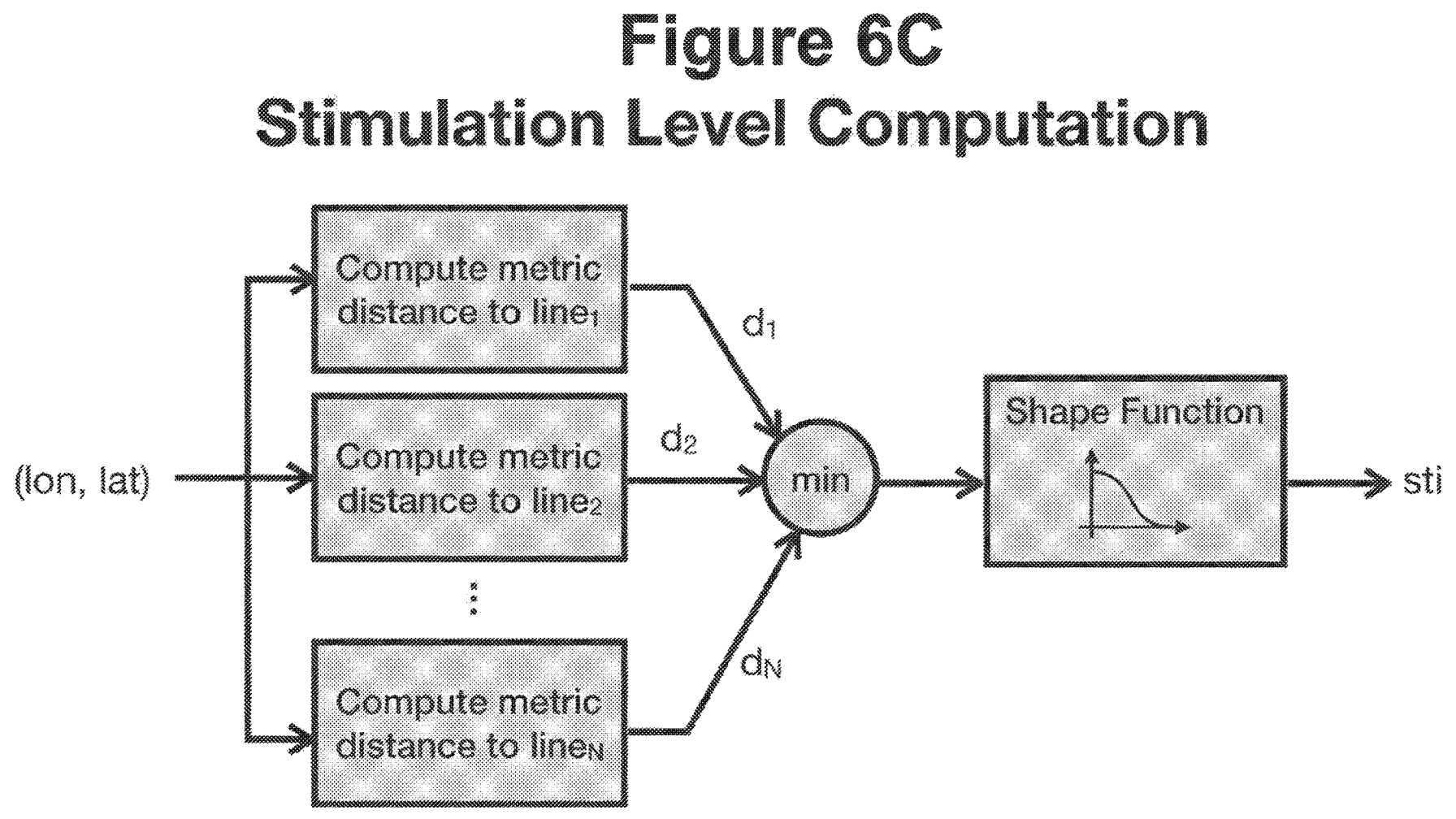

FIG. 6C illustrates an embodiment of stimulation level computation.

Figure 6D:
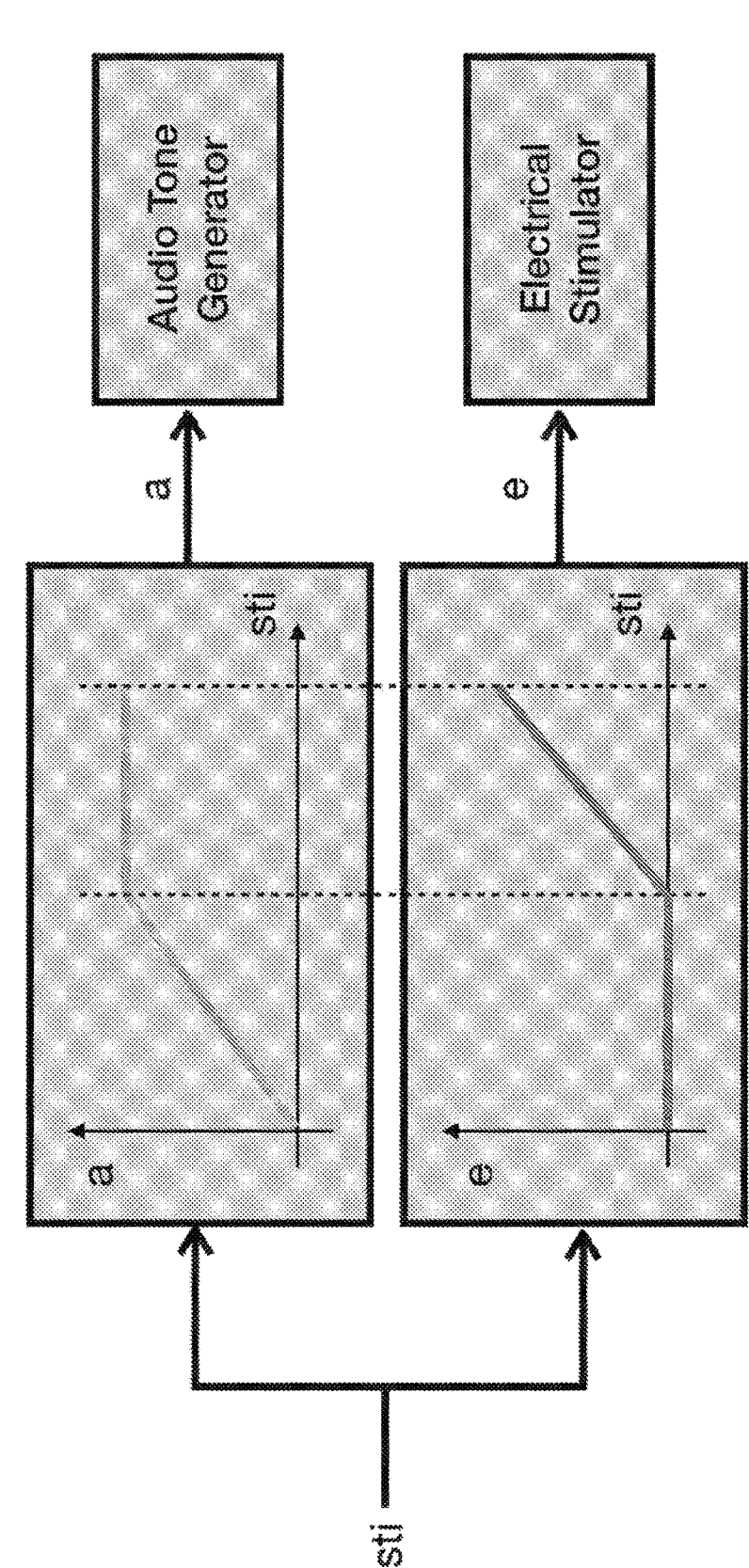

FIG. 6D illustrates the process of applying updated stimulus to a tagged animal.

FIGS. 7A-7D illustrate an embodiment of the process for defining a virtual fence associated with a paddock.

FIGS. 8A-8C illustrate an alternative embodiment for defining a virtual fence comprising vectors to define edges.

FIGS. 9A-9D illustrate an embodiment of the design of a paddock in accordance with the embodiment of FIGS. 8A-8C.

FIGS. 10A-10G illustrates the process of moving a herd from one paddock definition to another using a paddock design methodology in accordance with the embodiments of FIGS. 8A-8C and 9A-9D.

Figures 10A, 10B, 10C, 10D, 10E, 10F, 10G:
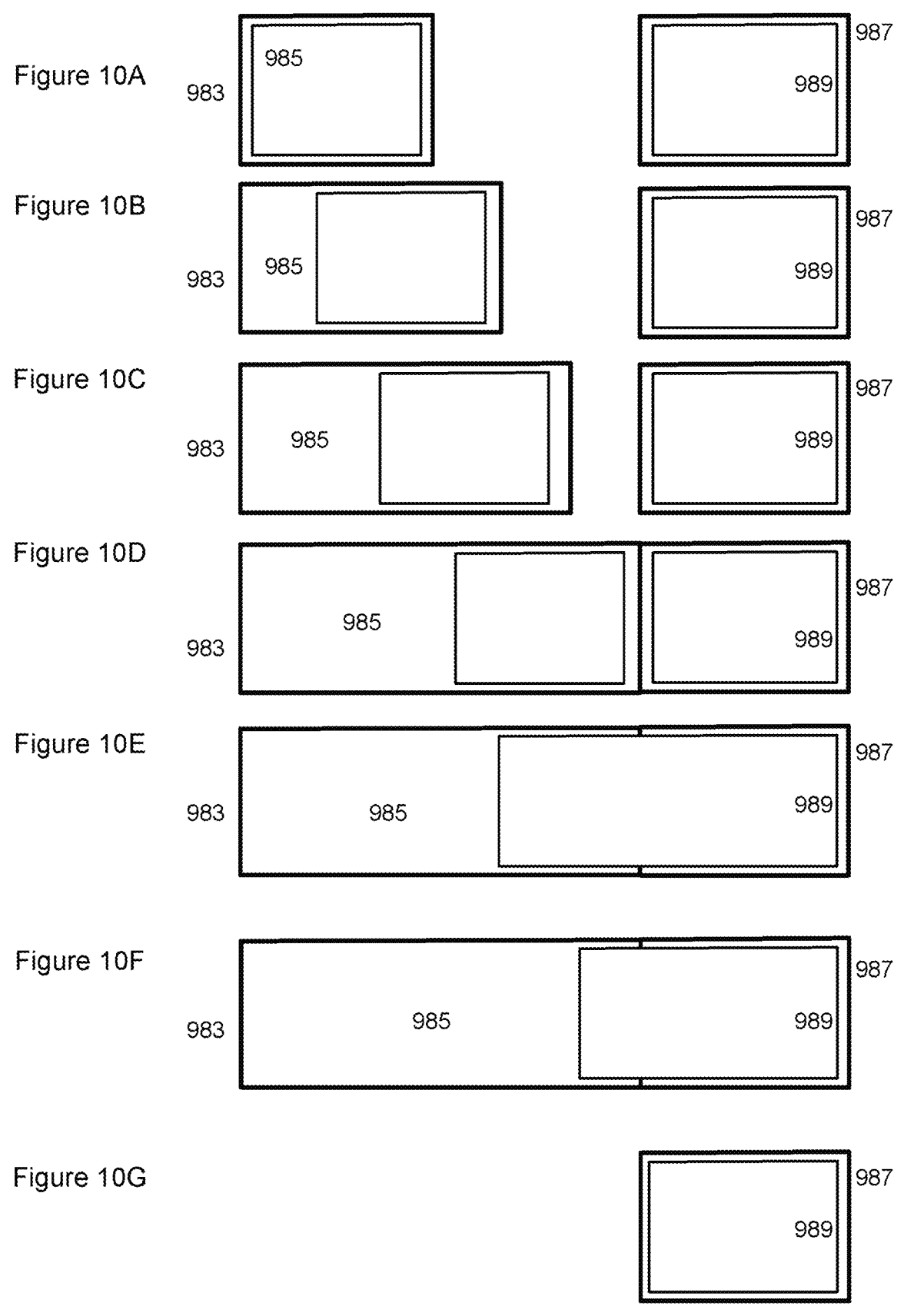
Figure 11:
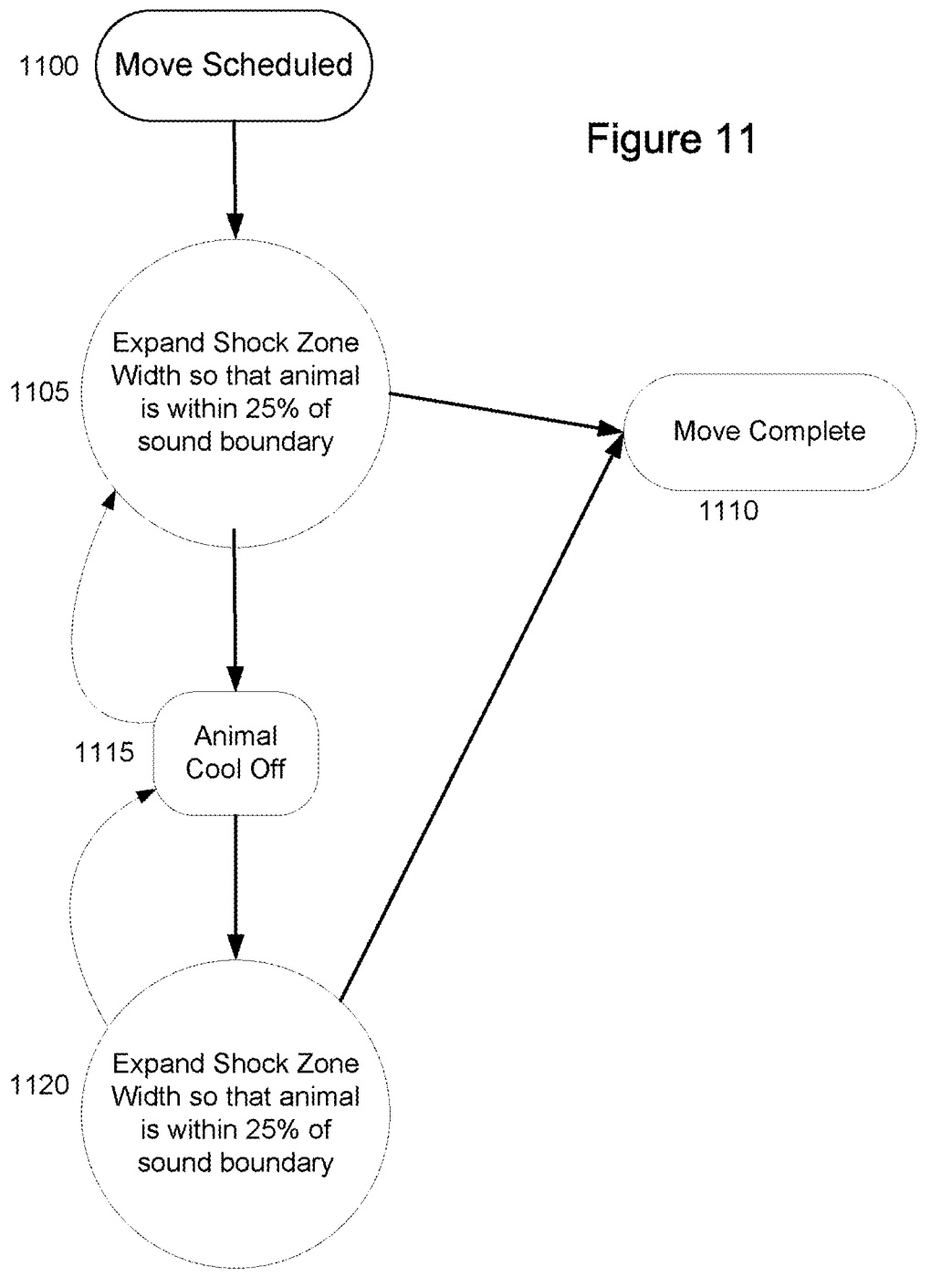

FIG. 11 illustrates in state diagram form the process illustrated in plan view in FIGS. 10A-10G.

Figure 12:
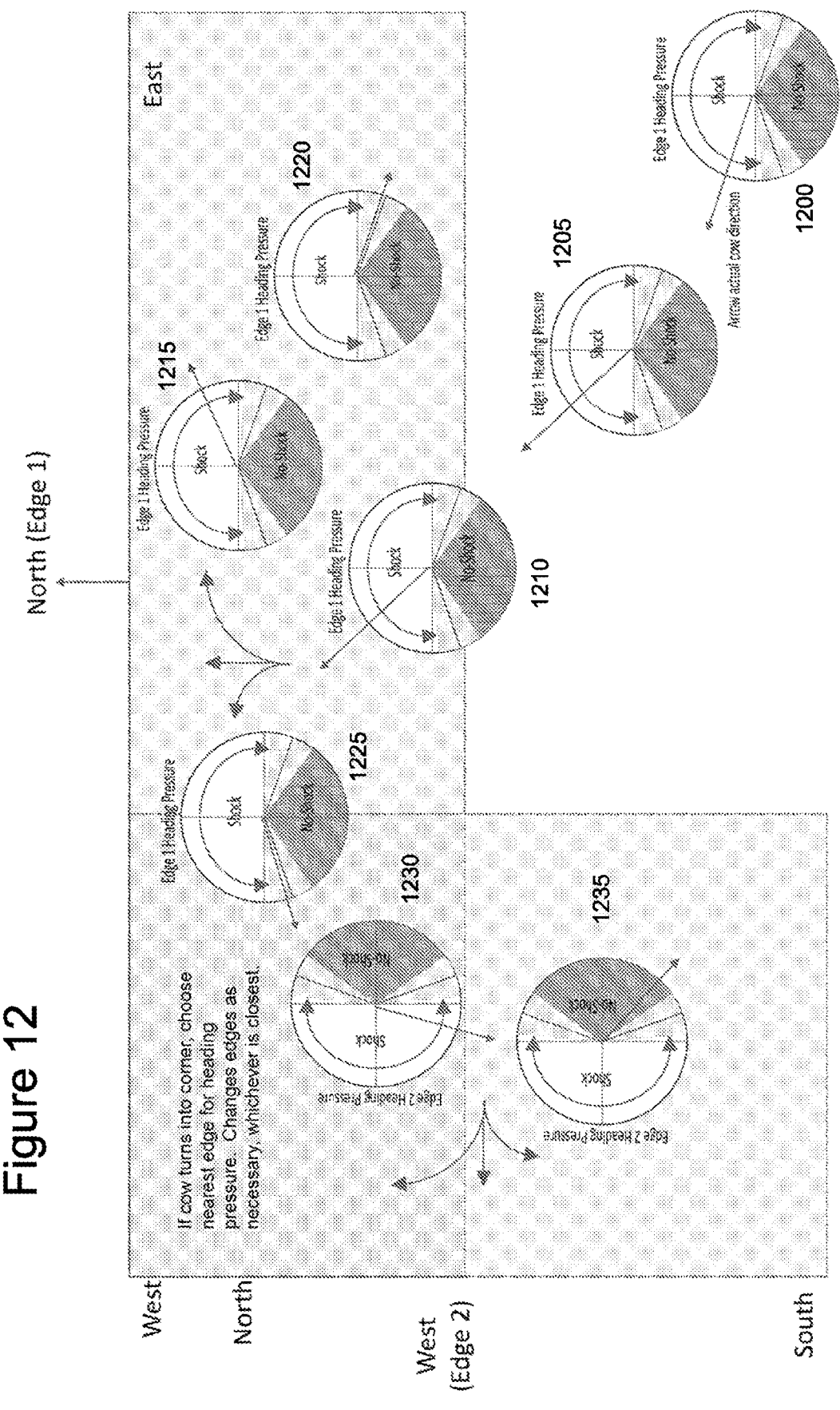

FIG. 12 illustrates the use of the animal's heading for animal management.

DETAILED DESCRIPTION OF THE INVENTION

Referring first to FIG. 1, the overall structure of an embodiment of the system of the present invention can be better appreciated. A cattle ranch 100 comprises a plurality of grazing areas, or paddocks indicated at 105A-B. In one or more of the paddocks, and in some cases all of them, a plurality of livestock is maintained. Each of the animals has affixed to it at least one animal tag 110, typically affixed to one ear (or both, if multiple tags), as a nose ring attached to or through the nasal septum, or around the neck as a collar. "Tags" and "collars" may be used synonymously in some instances hereinafter. In an embodiment, each animal tag is assigned a unique identifier. The animal tags or collars each communicate with at least one gateway 115A, where one or more such gateways are provisioned relative to the paddocks to permit wireless communication therebetween. In some embodiments, gateway bridges 115B can also be used. Each of the gateways connects to a network server 120, either wirelessly or via wired connection. In some embodiments, the network server 120 is configured as a communications head end cloud controller 120A together with an application backoffice server 120B, configured in the cloud which may be, in some implementations, a private cloud.

The gateways can be powered by any convenient means, including solar, battery, line, or any combination thereof. Depending upon the configuration, the network server can comprise one or more machines or servers, and can be either locally maintained or provided as a cloud-based service. A user of the system communicates with the network server via any suitable means, for example either a PC-based web application or a mobile application, indicated at 125. The web or mobile application permits the user to configure the operating parameters of the system, including defining the geometry and location of the paddocks, as more fully explained hereinafter. In an embodiment, the web or mobile application also provides analysis of the data retrieved from the animal tags to permit monitoring of the condition and location of each of the animals and of the herd as a group.

In an embodiment, the animal tags 110 communicate with the one or more gateways 115 using a Long Range low power wireless communications protocol, such as LoRaWAN promulgated by the LoRa Alliance. It will be appreciated by those skilled in the art that the system of tags 110 and associated servers comprise an embedded, power-constrained and bandwidth-constrained environment, that represents significant challenges and imposes significantly different design considerations when compared with conventional wireless environments Gateways 115A can be implemented on modest hardware such as, for example, a CPU configured with 512 GB RAM and 20 GB SSD or other data storage such as a hard disk, running an Ubuntu operating system. In some embodiments a virtual CPU [vCPU] can be assigned rather than a dedicated CPU. Gateway bridges 115B can be implemented using UDP or, in implementations desiring greater messaging reliability, TCP or other protocol and, in terms of hardware, can be configured similarly to a gateway 115A. Messaging between a gateway 115A and a gateway bridge 115B can be by any suitable messaging protocol, and for implementations requiring a small code footprint or having limited networth bandwidth can be, for example, Mosquito MQTT [Message Queuing Telemetry Transport] operating on top of TCP/IP. In some embodiments, the server 120A can be configured as a LoRa Server with a hardware configuration essentially the same as the gateways 115A, again with an Ubuntu operating system. The server 120B, operating in the cloud, can in some embodiments be a LoRa App Server, communicating with the server 120A via a remote procedure call protocol such as GPRC. The LoRa App Server communicates via any suitable protocol with a herd manager application running on a user device such as a personal computer, tablet, smartphone or similar device. Communications between the LoRa App Server and the herd manager application can be via any suitable protocol, including but not limited to GPRC/JSON REST, or MQTT. The backend software, in some embodiments maintained in the cloud as shown by servers 120A-120B, can be thought of as herd manager software since it directs the operation of the gateways and, in response to user input, transmits paddock definitions to the tags in the form of a virtual fence definition.

Referring next to FIG. 1B, the general operation of the system of FIG. 1A including its computer programming can be better appreciated. In general, the software can be appreciated as cooperating with the hardware portion of the system to create a finite state machine. In an embodiment, the states can be Boot, Test, Train, Confine, Relocate, and Track, each of which will be more fully understood from the remainder of this Specification but can be generally appreciated from FIG. 1B. On power up, the system boots, step 123, and once loaded the tags and the remainder of the system enter test mode, 126. If the animal has not previously had an animal tag, the state machine enters training mode, 129, where the animal is trained to respond to stimuli generated by the tag. If the animal cannot be trained, or the test shows the animal tag is broken, an error occurs, 132, and an error message is forwarded to the server 120. In most cases, the tag works and the animal responds as intended to the tag 110, in which case the state machine advances to Track mode, 135. If the animal associated with a given tag has already been trained—i.e., is a "veteran"—the training step can be skipped and the state machine advances directly from test 126 to track 135. When a virtual fence has been defined by the user and transmitted by the herd manager software, the state machine enters the confine state, 138. When it is desired to move the animals from a first paddock, defined by its first virtual fence, to a second paddock, defined by a different virtual fence, the state machine enters a relocate state 141. The relocate state can include multiple virtual fence definitions, typically although not necessarily representing incremental movements from the first paddock to the new paddock. Once the animals are relocated, the state machine reverts to the confine state.

Referring next to FIG. 1C, a generalized view of the process flow of system of FIGS. 1A-1B can be better appreciated. Initial deployment ends with the system in basic tracking mode, shown at 155, where GPS signals from the animal tags are monitored on a regular basis, for example about every 30 minutes. The herd manager software, typically maintained on server 120 which may be in the cloud as shown by servers 120A-120B, downloads a command for the devices to enter a training state, shown at 160, with the objective of training the animals to respond to stimuli generated by the animal tags. The stimuli can be vibration, shock, sound, or any other suitable form that causes the desired response from the animal being managed.

Once the animal training cycle is complete the process returns to basic tracking mode 155. The herd manager software downloads a command to enable the definition of a first virtual fence, shown at 165, which causes the virtual fence to be enabled within the animal tags, shown at 170. The formulation of the virtual fence definition is discussed in much greater detail hereinafter. Basically, the virtual fence definition comprises a paddock defined by its perimeter either in terms of longitude and latitude data for the vertices, or defined as a series of grid points, or as a series of vectors, or in any other suitable fashion for delineating a controlled area within which an animal may be monitored and also may be stimulated to move in a desired direction. Tracking continues, as shown by the loop from step 170 back to step 155.

Once the first virtual fence definition is downloaded and enabled, the herd manager software can direct a scheduled move of one or more of the animals, or can direct a specific animal to move in order for that animal to be isolated, as shown at 175. The directed move is implemented via the tags generating a stimulus to each of the selected animals, as shown at 180. In addition, animals that approach the perimeter of the virtual fence are stimulated to turn back toward the more central area of the paddock definition. In at least some embodiments the need for that stimulus is determined by the tag independently of the remainder of the system. Alternatively, in some embodiments, the herd manager software can communicate with the tag via the gateways and direct the tag to generate the stimulus.

Eventually, it will be desirable to move the herd to another paddock. To achieve this, in an embodiment a new virtual fence definition is downloaded from the herd manager, as shown at 185, causing a new paddock to be defined. Alternatively, one or more paddock definitions may have been previously defined and downloaded to the tags/collars, with the transitions from one paddock to another set by a schedule. The schedule can be downloaded from the server to the tags at any convenient time, for example either at the time the paddock definitions are downloaded to the tag, at the time the movement is to be initiated, or any intermediate time. The animals are then moved from the first paddock to the second paddock, as shown and discussed in greater detail hereinafter. Tracking continues, as shown by the loop back to step 155.

Figure 1H:
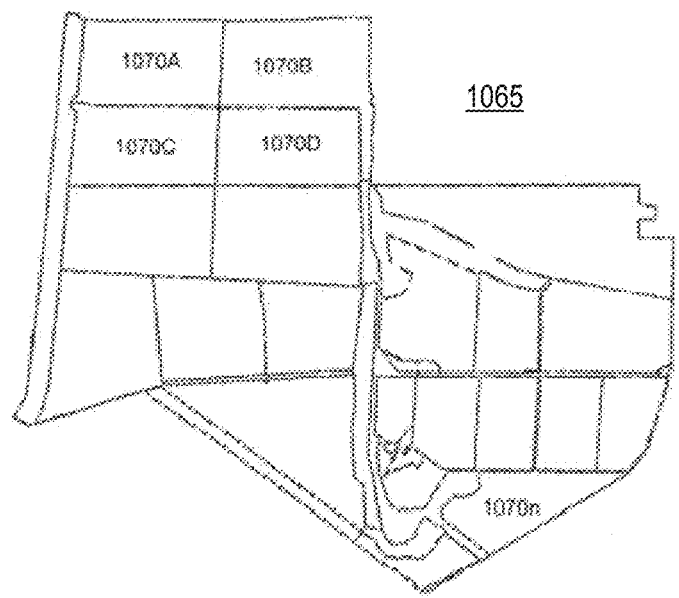
FIG. 1H illustrates an example of a ranch divided into a plurality of paddocks.

Referring next to FIG. 1D, an animal tag 110 is shown affixed to the ear of a cow. Alternatively, a tag can be configured as a collar to be worn around the neck of the monitored animal, as shown in FIGS. 1G-1H and discussed in greater detail below. In some embodiments, two tags can be used, one on each ear.

Figure 1E:
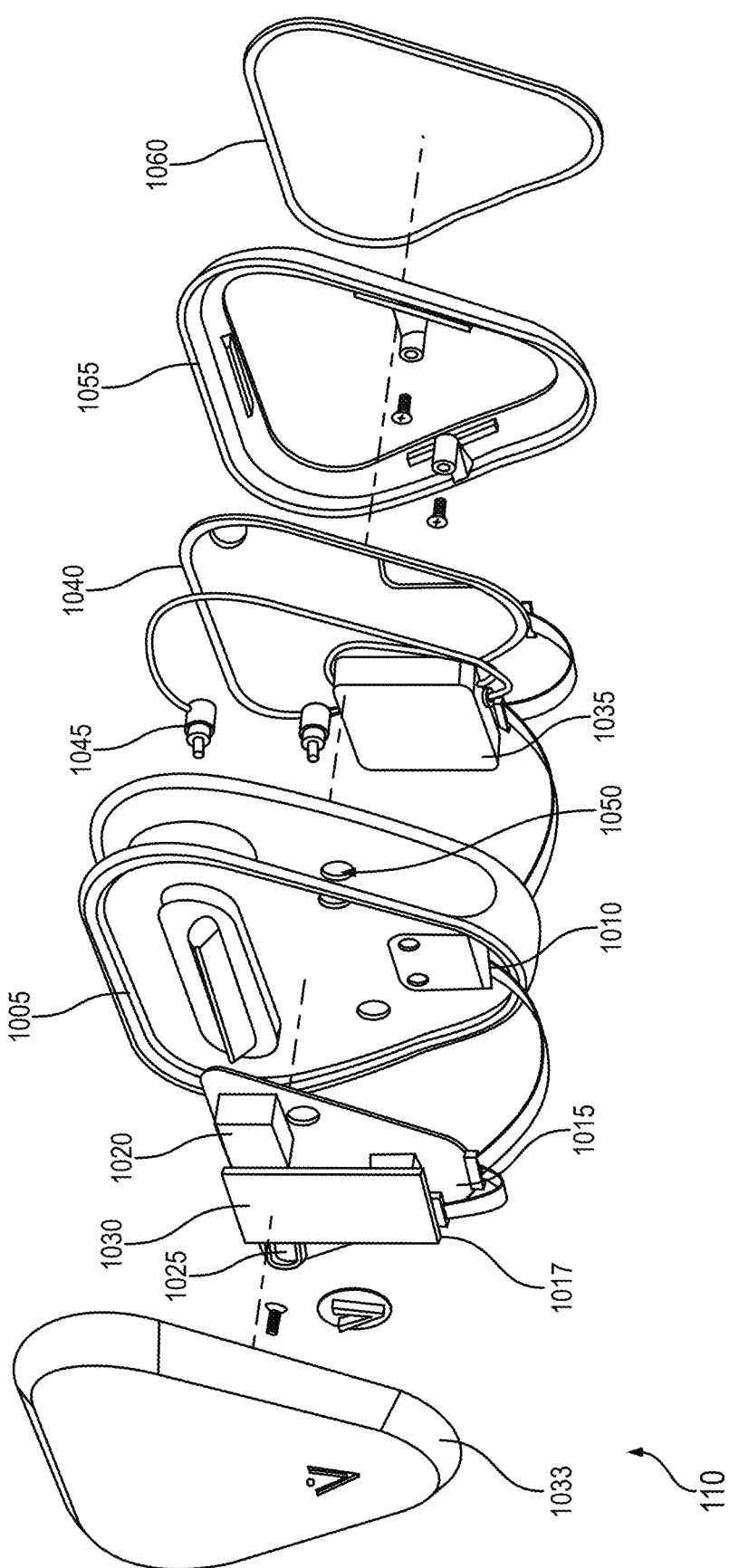
FIG. 1E shows in exploded perspective view the constituent components of an embodiment of the animal tag of FIG. 1D.

Referring next to FIG. 1E, the structure of the animal tag 110 can be better appreciated. A central support structure 1005 comprises two parallel plates sufficiently spaced apart as to permit the structure to be passed over the ear of a monitored animal. The plates are rigidly connected at one end, and a spring clip 1010 is positioned at the opposite end, such as a vertex, to maintain the tag in place on the ear. For a triangular tag as shown in FIG. 1E, a logic board 1015 comprises the circuitry of FIGS. 2A-2C, discussed hereinafter. The logic board 1015 also provides a mount for an antenna 1017, a transformer 1020 as well as an audio source such as a buzzer 1025 and a transducer for vibration such as an eccentrically rotating mass (ERM) 1030. A bezel 1033 sandwiches the logic board 1015 against the support structure 1005. On the opposite side of the support structure 1005 is a battery 1035 for powering the logic board. In some embodiments, a solar panel 1040 is implemented to charge the battery 1035. A pair of shock electrodes 1045 are positioned in orifices 1050 in the support structure 1005 such that the electrodes are firmly in contact with the ear of the monitored animal when the tag is clipped to the animal's ear such as shown in FIG. 1D. A solar panel bezel 1055 and suitably transparent cover 1060 sandwich the solar panel, shock electrodes and battery against the support structure 1005. In at least some embodiments, the assembled tag 110 is substantially weatherproof or at least weather-resistant.

Figure 1F:
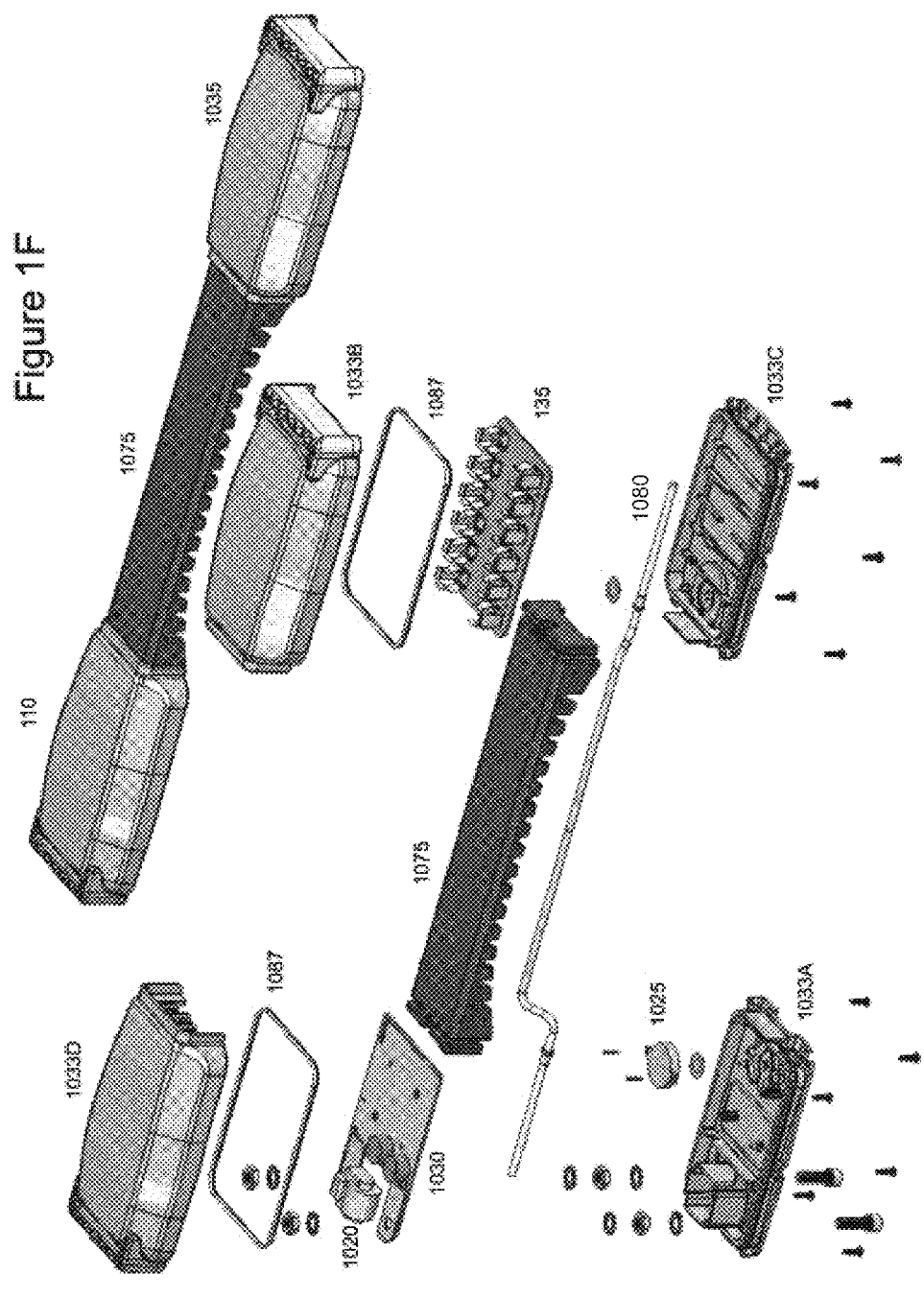
FIG. 1F illustrates an alternative embodiment of the animal tag of the present invention.
Figure 1G:
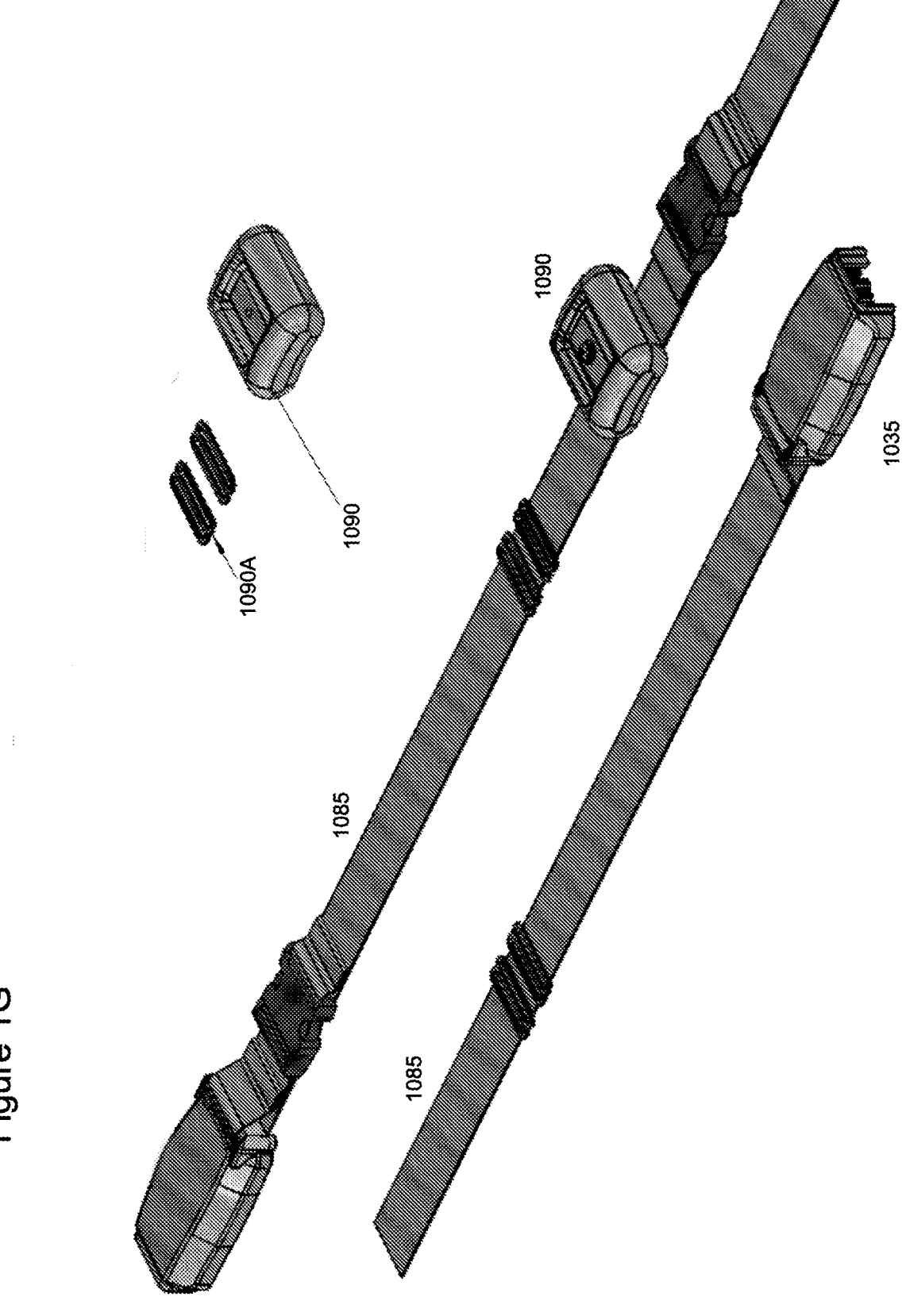
FIG. 1G illustrates a connective strap the cooperates with the tag of FIG. 1F to ensure good positioning and retention of the tag of FIG. 1F.

Referring next to FIGS. 1F and 1G, an alternative embodiment of the tag 110 is shown, configured as a collar to be worn around the neck of the cow or other animal. In an embodiment, such as that shown in FIG. 1F, a tag 110 is disposed at an end of a strap or connector 1075, and a battery (or battery pack) 1035 is disposed at the other end of the connector 1075, typically within a suitable housing where the battery housing 1035 is connected to the tag via a suitable conductor cable 1080. The elements of the tag 110 of Fig. 1F that are common to the tag 110 of FIG. 1E are shown with like reference numerals and have substantially the same functions. FIG. 1G shows a strap 1085 with weight 1090 and male/female connectors of any suitable type for connecting to the tag of FIG. 1F, such that the combination encircles the neck of the animal being monitored. It will also be appreciated that a still further embodiment of the structure shown in FIG. 1F can comprise two tags, one at either end of connector 1075. In either alternative, the strap 1085 may provide the battery 1035 shown in FIG. 1F, or may provide two or more batteries, such as an additional battery as shown at either end of the strap in FIG. 1G. The latter configuration is well suited to embodiments having a tag at either end of connector 1075. The weight 1090, typically immovably affixed to the strap by retainers 1090A, counterbalances the combination of the strap, tag(s) and batteries such that the tag (or tags) stay properly positioned around the neck of the animal. The length of the strap 1085 can be adjustable to permit a good fit with the neck of the animal, care being taken to ensure the strap cannot catch on a fence or other obstruction and injure the animal. Seals 1087 cooperate with housings 1033A-D provide a substantially waterproof seal. Various bolts, washers, and nuts retain the components in place.

FIG. 1H illustrates a ranch generally indicated at 1065 is divided into a plurality of paddocks 1070A-n. Areas of the ranch that represent unsafe locations for the managed animals, such as rivers and lakes beyond where the animals may drink can be either excluded or included in the paddock definitions, depending upon the implementation. As will be better described hereinafter, one aspect of the present invention is enable the remote movement of a herd of monitored animals such as cows to be moved from one paddock to another with minimal if any direct human interaction with the herd, such as cowboys, men on horses or machinery, etc. As described in greater detail in connection with FIGS. 3A-3F and 7A-7D, the paddocks are used in at least the confine and relocate states shown in FIG. 1B.

Referring next to FIGS. 2A-2B, the hardware configuration of the animal tag 110 can be better appreciated, with each figure providing a different level of detail. With particular reference to FIG. 2A, in an embodiment, the tag is powered by a battery 200 and, in addition or alternatively, can also include photo-voltaic (i.e., solar) charging panels 205 combined with rechargeable batteries, or other suitable energy storage means such as a super-capacitor. A processor such as a microcontroller 210 receives input such as, for example, paddock definitions, from the servers (120 in FIG. 1) via wireless link 215. The processor 210 also receives locally generated input from one or more sensors including but not limited to GPS 220, accelerometer or other motion sensors 225, magnetometer 230, thermometer 235, heart rate sensor 240, etc. The sensors provide monitoring for numerous aspects of the animal's condition and location, including health related issues, step count, chewing cud, eating, mating, running or walking, sleeping, and so forth. Data, command programs, fence definitions and other relevant information is stored on storage 245. When the system is in the training, confine, or relocate states, the processor can cause a stimulus to be generated to cause a response in the animal being monitored. The stimulus can take the form of an electric shock, a vibration, an audible alarm or other stimulus, shown at 250 sufficient to cause a desired response in the animal. Shock electrodes 255, often comprising the physical electrodes together with a boost circuit fed by the battery 200, connect the tag to the animal either through the ear or through a collar. Data from the tag can also be forwarded to the servers 120 via the wireless link 215.

Referring next to FIG. 2B, in an embodiment the tag 110 can be seen to generally comprise a Controller Module 260 and a Stimulus Module 263. For clarity, elements of FIG. 2B which correspond to elements of FIG. 2A are given the same reference numeral. The controller module comprises a processor or microcontroller 210 which can be, for example, an STM32L151C. The microcontroller 210 receives a clock signal from a crystal or oscillator reference that is used as a time source. Wireless access to the gateways 115A can be provided by a long range [LoRa] wireless module 215, such as an SX1276IMLTRT connected to the microcontroller 210 and an RF (TX/RX) Switch 266 for bidirectional communication. While the embodiment shown preferably uses a wireless module that complies with the LoRa standards to conserve power while still providing long range connectivity, other types of wireless communications modules can be used in other implementations. A GPS module 220 also provides input to the microcontroller 210 to provide the animal's geographic location data, typically in a representation of longitude and latitude.

Still further, the microcontroller 210 receives additional inputs from one or more accelerometers, shown as G Sensor 225 in FIG. 2B. In an embodiment, the G sensor comprises at least one three-axis accelerometer and may comprise several two-axis or three-axis accelerometers in any combination suitable to the embodiment. A temperature sensor 235 provides temperature data to the microcontroller 210. In an embodiment, the temperature sensor can comprise one or more temperature sensors, at least one of which is configured to be placed immediately proximate to the skin of the animal's ear so that the temperature data from that sensor reflects the animal's temperature. If other temperature sensors are used in a given embodiment, such other sensors can monitor ambient thermal conditions, internal temperatures, and so on. A buzzer 250 can provide audio stimulus to a monitored animal. A storage device such as EEPROM 269 enables programs, data, or any combination to be stored externally to the microcontroller 210. An 10 expander module 272 can be provided to increase the number of 10 ports. Power to the Controller Module 260 is generally supplied by battery and associated battery regulator distribution network 200, which, it at least some implementations, will also supply power to the Stimulus Module 263.

The Stimulus Module 263 generally comprises a vibration portion 278 and a shock portion 281. The vibration portion 278 comprises a haptic driver 284 such as a TIDRV2605 together with an eccentric rotating mass actuator (ERM) or a linear resonant actuator (LRM) 285. The vibration portion receives command input from the microcontroller 210 and power from the battery regulator distribution network. The shock portion 281 comprises a capacitor charger 287 such as an LT3420EMS driving a transformer and associated circuitry 290 powering a capacitor 293. A switch 296 supplies a high voltage shock to the animal via shock electrodes 255, also seen in FIG. 1E. The haptic driver 284 and capacitor charger 287 are controlled from the microcontroller 210. In some embodiments, a separate battery and associated power distribution network 299 can be implemented for association with the Stimulus Module 263.

Figure 2C:
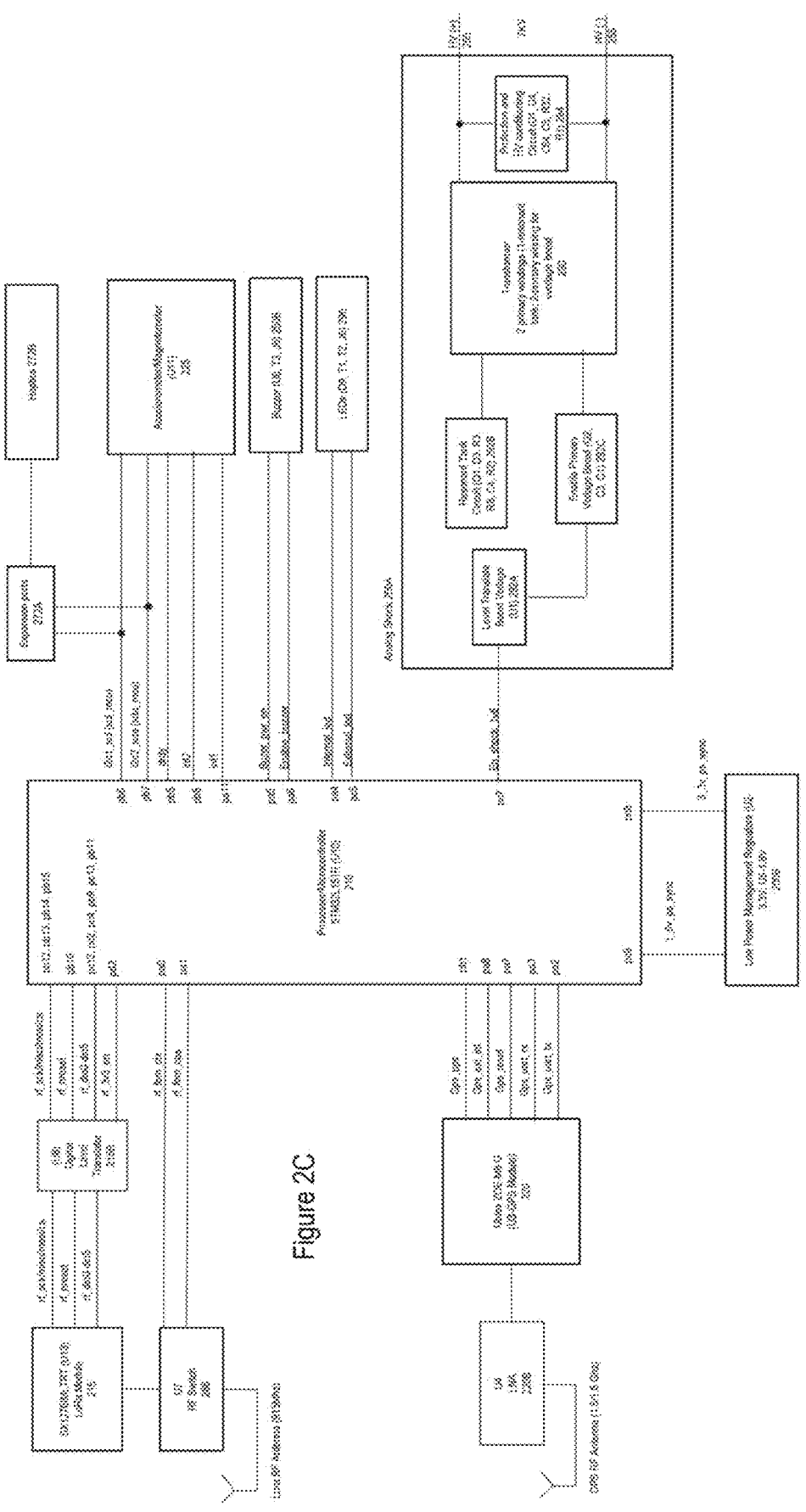
FIG. 2C illustrates an alternative embodiment of the circuitry of FIG. 2B.

With reference next to FIG. 2C, an alternative embodiment to the circuit of FIG. 2B can be appreciated, where like elements have like reference numerals. Thus, processor 210, which can be a microcontroller such as STM32L151R, receives regulated power, typically from a battery or other source [not shown] through regulators 200B. Further, the processor 210 receives and transmits LoRa-compatible signals from/to LoRa module 215, after level translation through digital level translator 215B. RF switch 266 switches between send and receive modes as appropriate. RF switch 266, controlled by processor 210, switches a LoRa RF antenna, typically tuned for 915 Mhz signals, between receive and transmit. Similarly, GPS signals are received in a low noise amplifier 2220B from a GPS antenna and sent to GPS module 220. The GPS module 220 thereafter transmits its output to processor 210. The processor 210 also receives input from accelerometer/magnetometer 225, indicative of the movement and heading of the monitored animal.

In appropriate circumstances as detailed elsewhere herein, the processor 210 of the embodiment of FIG. 2C provides one or more of haptic, audio, visual or electric shock outputs, as indicated by reference numerals 272B, 250B, 296 and 250A, respectively. Additional types of outputs can also be provided for through expansion port 272A. From FIG. 2C, the embodiment of the electric shock module 250A can be seen to comprise a boost voltage circuit 292A that feeds primary voltage boost enable logic 292C, which cooperates with tank circuit 2926 to provide an AC signal suitable for boosting in transformer 290 to a suitably high voltage, low amperage signal appropriate for stimulating the monitored animal to move or otherwise change its behavior as desired by the system. The high voltage output is conditioned in module 294, with contacts 255 providing electrical connection to the monitored animal.

Figure 3A:
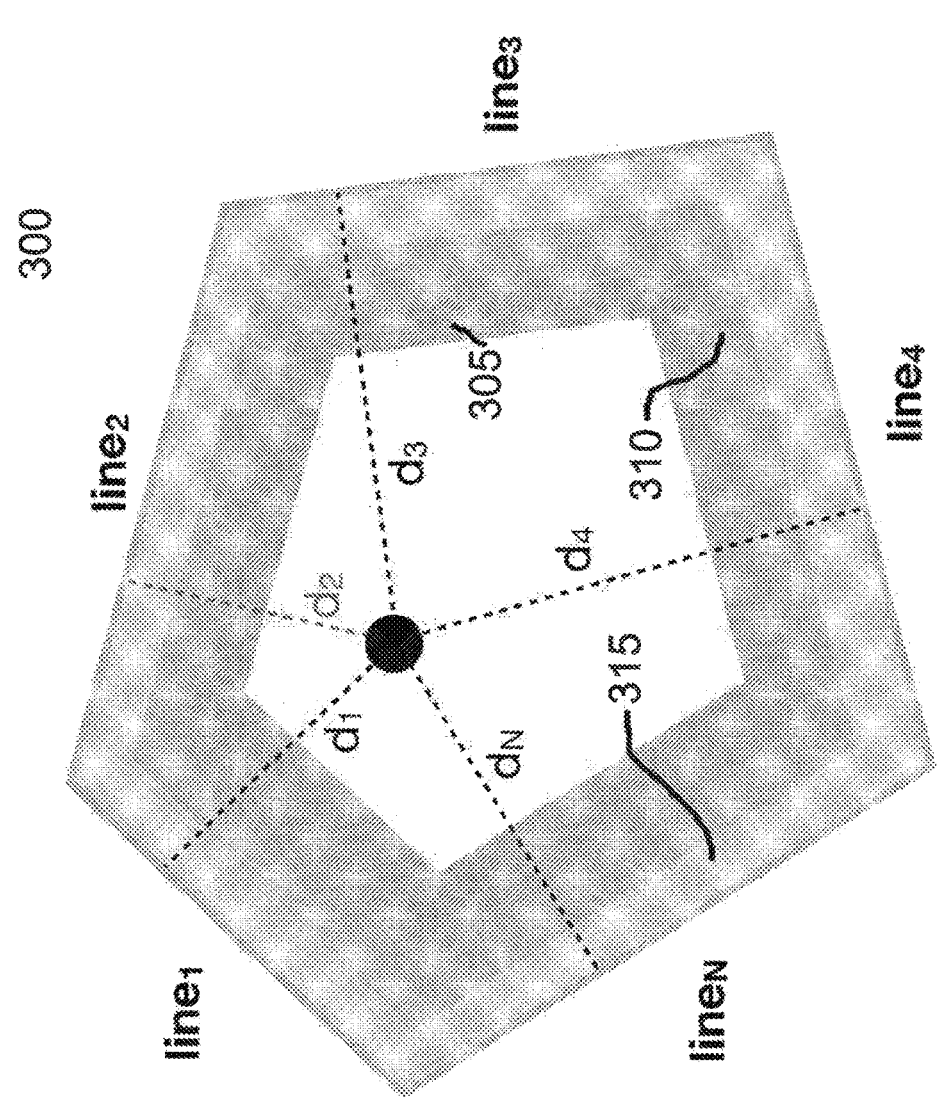
Figure 3B:
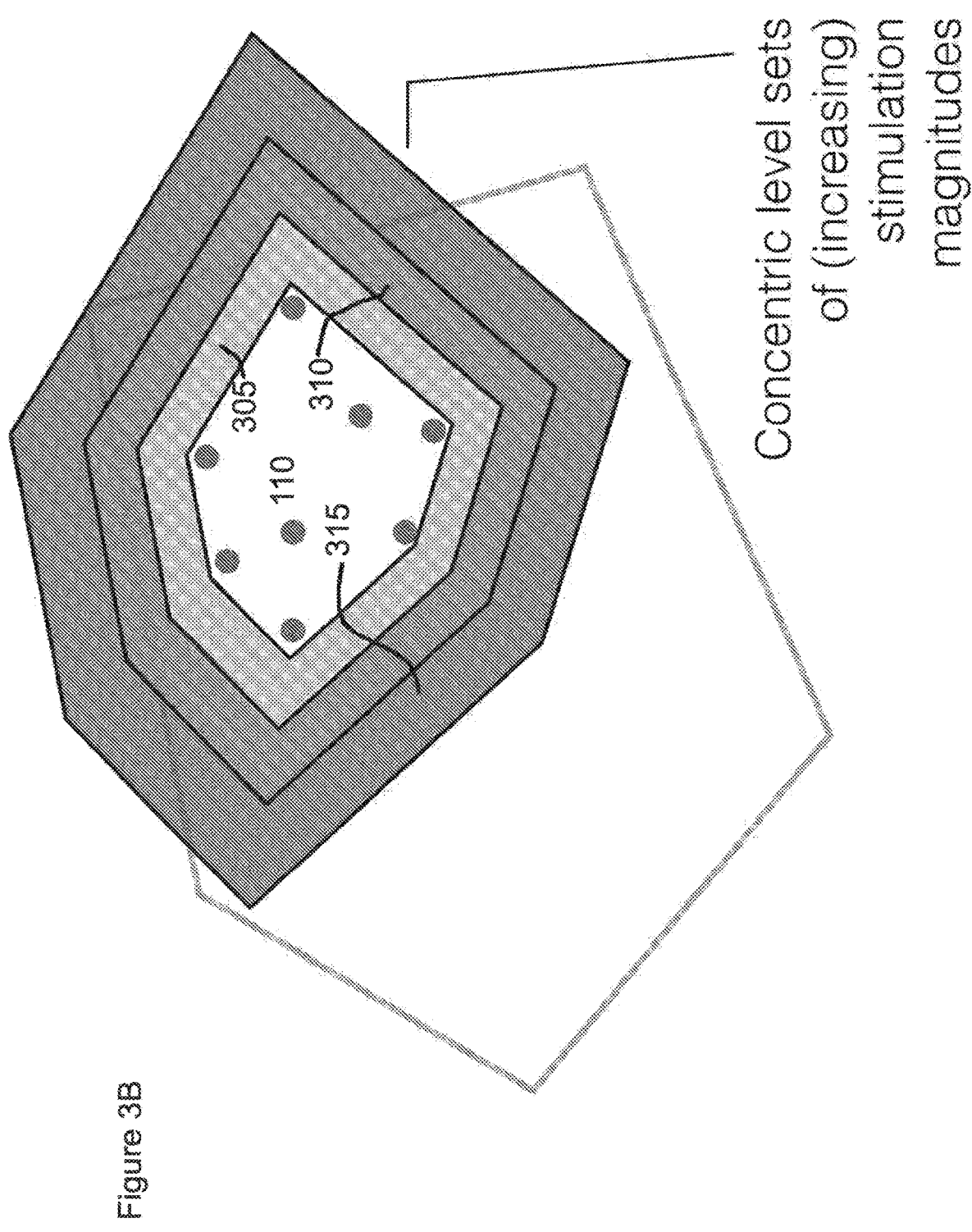

Referring next to FIGS. 3A-3G, one embodiment of the virtual fence aspect of the present invention as it relates to the confine and relocate states can be better understood. As noted previously, the basic objective of the virtual fence of the present invention is to cause a monitored animal to remain within an area defined by the virtual fence, or what is referred to herein as a paddock. A paddock can be any convenient shape, with any number of vertices, as shown in FIGS. 3A-3B. The virtual fence is basically defined by drawing segments from vertex to vertex. The segments can be linear or other desired shape, or a combination. Thus, for the paddock 300 shown in FIGS. 3A, five vertices are connected by straight lines Line, to Line$_n$, in this case with n=5.

For FIG. 3B, six vertices are defined. Within the outer edges of the paddock are one or more boundary zones or regions. In the example shown in FIGS. 3A and 3B, three boundary regions 305, 310, 315 are shown. The location of a monitored animal such as a cow is shown by a circular dot

[one in FIG. 3A, several in FIG. 3B], and the distance from the animal to each of the sides of the paddock is determined in the processor 210. Depending upon the orientation of the magnetometer 230 and GPS, the direction of movement of the animal can be combined with their location to determine whether the animal is approaching a boundary zone. In the confine state, the animal is not permitted to exit the paddock. If the animal is approaching the nearest boundary zone, monitoring can be increased. Upon entry into a boundary zone, a first stimulus can be applied to induce the animal to return to a more central location within the paddock. If the animal does not turn, but instead proceeds into the second boundary zone, a different or more intense stimulus, or some combination, can be applied, again to induce the animal to return to a more central portion of the paddock. Should the animal continue into the outermost boundary zone, a further stimulus can be applied. As discussed in connection with FIG. 2A-2B, the various stimuli can be audible, vibratory, or electric shock.

In the unlikely event that the animal proceeds past the outermost boundary, and thus outside the paddock defined by the virtual fence, a message can be sent to the herd manager software operating on the server to alert the user to the error condition. In some embodiments, if an animal continues out of the boundary zone and becomes uncontrollable, all stimulation will be disabled to maintain animal welfare. Upon animal return to a paddock through natural or man-made means the virtual fence containment stimulation will be re-enabled. In an alternative embodiment, should the animal continue outside the boundary, the stimulus can be turned off for a period of time to de-stress the animal, and then reapplied either continuously, pulsed repetitively, or applied in differing combinations to encourage the animal to return to within the paddock boundary. In still other embodiments, especially in environments with topological dangers, risk of predators, or other environmental concerns that impact the animal's welfare, it may be desirable to maintain application of the stimulus in some form or combination. In each of the above alternatives, the alert sent to the network server can be canceled upon the animal's return to the virtual paddock.

While the boundary zones shown in FIGS. 3A and 3B are concentric, it will be appreciated that the zones need not be concentric in all cases and may vary to take into account geographic variation, such as ponds, lakes, or rivers, or differing portions of the landscape such as a rock face or other variation in terrain. In such situations, where a non-concentric boundary zone is desirable, the variation can be either a shorter distance between transitions from one zone to the next, or fewer zones altogether for a portion of the fenced area.

Referring next to FIGS. 3C-3F, the Relocate state discussed briefly in FIG. 1B can be better understood. The Relocate state refers to moving one or more animals from a first location to a second location. Specific animals can be selected based on the unique identifier associated with each tag. However, in most cases multiple animals, and likely an entire herd, will be moved so that they cease grazing in a first paddock and begin grazing in a different paddock, with both paddocks defined by their respective virtual fences. Thus, for a ranch 325 has a first paddock 330, with a group of animals within the paddock. The user elects to have the system of the present invention move the animals from the paddock 330 to a new location 335. The Relocate state comprises defining a series of incremental changes in the paddock definition, shown in FIG. 3F, by with the herd is induced to move from paddock 330 to paddock 335. For each incremental move 340-355, the new incremental paddock definition is calculated by the animal tag as a series of linear movements of the center of the paddock down a vector path defined by the user in the herd manager at the time of scheduling the animal movement. The path and scheduled linear moves are transmitted once to the animal tags of the animals selected for movement prior to the scheduled beginning of the movement.

Once the schedule begins the animal tag virtually moves the paddock center to new locations on the vector path and the paddock boundaries maintain their positions relative to the paddock center as it is moved along the vector path. The animals are then stimulated as discussed above to move in the desired direction. In most cases, the majority of the herd will begin moving with little stimulus. For herd animals such as cows, the initiation of a movement by the herd is typically sufficient to induce most of the herd members to start to move as well. However, in the event that one or more animals do not respond quickly to the stimulus from the tag, or to the overall movement of the herd, a settling time is implemented while those outlier animals are stimulated to return to within the area defined by the incremental paddock, as shown in FIGS. 3D and 3E. Once the herd is collected within the new incremental paddock, the next sequential incremental paddock is calculated by each tag to continue moving the paddock down the path programmed at the time of scheduling the move. The process iterates until the herd arrives at the new paddock 335.

Figure 3G:
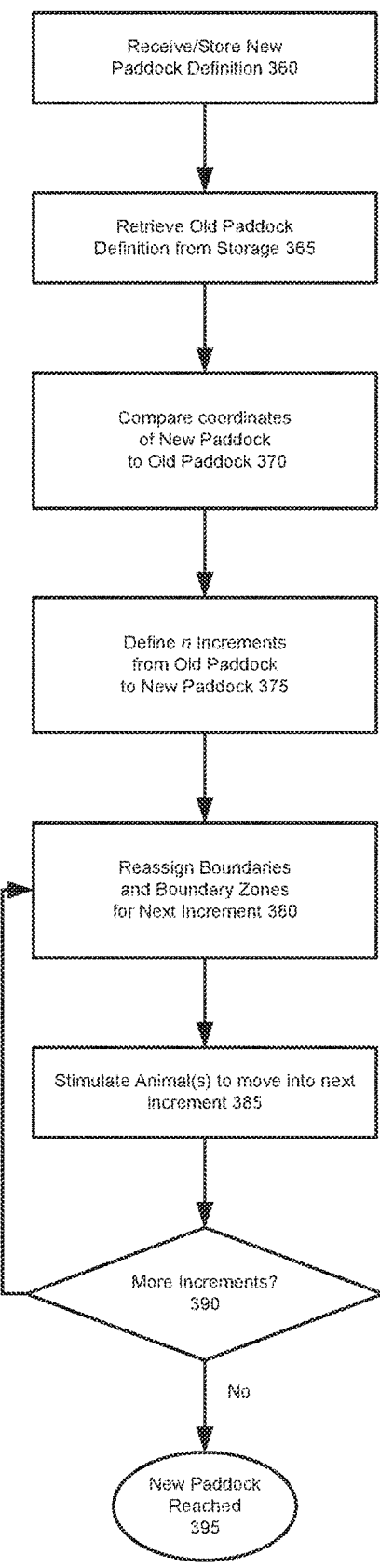
FIG. 3G illustrates in block diagram form an embodiment of the software architecture of the present invention.

The foregoing process can be appreciated in flow diagram form shown in FIG. 3G. The process initiates at step 360 with the receipt and storage at the server 120 of a new paddock definition. The old paddock definition is retrieved from storage at step 365 and the coordinates of the new paddock are compared to the coordinates of the old paddock at step 370 to define a vector path for the herd to follow during movement. A schedule of how far to move down the vector path for each incremental paddock from the user is provided, or, put differently, n increments from the old paddock to the new paddock are provided (step 375). The herd manager software operating in the server 120 then transmits the path, the incremental schedule to move for each iteration of the path, and the new paddock area to the animals selected for movement, which causes the boundaries and boundary zones to be redefined for the tags worn by those animals, as shown at 380. The selected animals are then stimulated to move to the newly defined incremental paddock. Once the selected animals have moved to the incremental paddock, including any necessary settling time to allow outlier animals to return to the herd, the process determines whether more increments exist, step 390. If more increments are required before reaching the destination paddock, the process loops to step 380 and iterates. When the animals reach the destination paddock 335, no more iterates await and the process ends at step 390.

In an alternative embodiment, each of the incremental paddocks can be predefined and downloaded in advance from the Herd Manager, for example at the time of scheduling of the moves, or the boundaries of each successive incremental paddock can be downloaded during the scheduled move. Still another alternative is to calculate the boundary of each incremental paddock separately rather than have the centers of each increment follow a vector path as described above. A still further alternative embodiment is described hereinafter in connection with FIGS. 8A-8C.

Referring next to FIGS. 4A-4B, the operation of an embodiment of the system can be understood in greater detail. As previously discussed, the system can generally be considered to be an integration of three major groups: a user device including an input/output interface, a network server layer that includes one or more network servers together with one or more wireless gateways and bridges, and an animal tag layer. The user device, as noted previously, can be a PC, smartphone, tablet, or dedicated device, where the user enters fence definitions, operating parameters and instructions and receives status information and other data. The network layer receives the user inputs and, as appropriate, stores those inputs and converts them into commands that are either managed at the server levels or are transmitted via the gateways and bridges to the animal tags. The animal tags, each of which is a unique ID and one or more of which are attached to each animal, receive data and commands from the server and provide status and other data back to the server. Further, the tags are capable of operating essentially independently of the server for extended periods, as long as the monitored animal stays within the defined paddock and no other commands are received from the network. While operating substantially independently, the tags may send back status information that is used by the network server for herd and animal analytics, which in turn may result in information being transmitted from the network layer to the user device or devices.

With reference specifically to FIG. 4A, which omits for purposes of clarity typical boot and self-test processes, at 400 a user inputs, or selects previously stored, coordinates or other definitional information to establish one or more virtual fences, each of which forms the perimeter of their respective paddocks. In addition, the user has the option of setting or selecting a relocation schedule for moving the monitored animals from one paddock to another. Further, the user can select or input monitoring parameters, alarm conditions, and data analysis processes that provide to the user status and other information as desired by the user to facilitate herd management. The pre-stored virtual fence definitions, schedules, and data analysis information is supplied from the network server layer as shown at 405. Current paddock definitions, whether newly-input or previously stored, schedule, and monitoring parameters and alarm conditions are supplied to the network server layer as shown at 410, 415, and 420. If stored paddock definitions or other stored parameters are used, in some embodiments the stored data can be directly accessed for network layer storage by the network servers, rather than being retransmitted from the user device.

The network layer updates the stored paddock definitions in the tag, shown at 425, together with any schedule definitions or alarm condition definitions. Depending upon the implementation, multiple paddock definitions can be stored for future selection or for substantially independent relocation from paddock to paddock. Further, the network layer can provide selections of data types to be monitored. It will be appreciated that sensor data monitored by one tag may be different from that selected for monitoring at another tag. The result is that the sensors selected for monitoring can be specific to a single tag and the associated animal, the tags associated with some animals, or the tags associated with an entire herd.

The paddock definitions and other information stored in the tag are, in most cases, used either to determine the existence of an alarm condition, shown at 430, or to contain or move the animal associated with the tag, shown at 435. Both functions can involve data from the various sensors implemented within the tag. In an embodiment, those data can include, but are not limited to, GPS data 440, accelerometer data 445, magnetometer data 450, Altimeter data

453, temperature data 455, heart rate data 460, battery level 465, and data from other sensors. The data is collected and analyzed as appropriate within the microcontroller of the tag, and provided for the comparisons made at 430 and 435. Depending upon the data selected for monitoring at the user and network server levels, collected data in either raw form or after some amount of processing is forwarded to the network server level shown at 475. The collected data from one or more tags is then further analyzed if necessary, and also if necessary, integrated in a desired manner sufficient to provide a report to the user. Any reporting is then forwarded to the one or more user device(s) as shown at step 480.

In the event that the data collected at 470 yields an alarm condition at 430 when compared with the data and instructions received in the tag at 425, the alarm data is forwarded to the network server layer at 485. Depending upon the alarm condition and the current state of instructions from the user, an alarm message or report is developed and forwarded to the user, as shown at 490. Depending upon the nature of the alarm condition, the system permits the user to re-engage at step 400, where the user can enter new parameters, change instructions, and define new alarm conditions or otherwise respond to the alarm report.

In most cases, the tag associated with any given animal will be in the confine state. As discussed above, and additionally hereinafter, the confine state involves monitoring the animal to ensure that the animal stays within the paddock defined by the current virtual fence definition. Most the time, especially after a monitored animal has completed the training cycle described in connection with FIGS. 1B and 1C, no alarm conditions are generated. In this nominal state the system will typically be configured to periodically report status information regarding animal position and general animal health and welfare at a periodic rate where the periodic rate is a function of how long the batteries should operate (for example, a 30 to 60 minute reporting interval). This period of independent or autonomous operation permits reduction of power usage which can be important in at least some embodiments of the tag where solar recharging of the batteries is at least partly relied upon to maintain monitoring of the associated animal and communications with the network layer. At the time defined by the schedule either stored in the tag or communicated by the network layer, the tag switches from the confine state to the relocate state. When that change occurs, or shortly thereafter as the incremental moves described in connection with FIG. 3F begin to occur, the tag generate a stimulus, shown at 495, to induce the associated animal to move in the selected direction. It will be appreciated that the relocate state can also be entered when it is desired simply to isolate an animal from the herd, such as for breeding, health, or other reasons. In such instances, incremental paddock definitions may not be required to achieve the desired separation of one (or more) animals from the remainder of the herd.

Referring next to FIG. 4B, the confine process operating within the animal tag are shown in flow diagram form and can be understood in greater detail. It will be appreciated that the relocate process is substantially similar for each incremental paddock definition. Steps that correspond to steps in FIG. 4A are given the same reference numerals for clarity of the relationship. The process starts at 4000, and at 425 one or more paddock definitions are received and stored in the tag's memory. Boundary zones are either received from the network layer or calculated locally by the tag's processor. Schedules, if any, are stored, as are any different alert conditions. The process continues by capturing data from the various sensors 440 through 467. Although the process flow for steps 440-467 is shown as a serial flow, the process can also be performed in parallel, or any combination of parallel and serial data collection. The captured data is collected at stored at 470 and, as appropriate to the implementation and instructions from the user, reported to the network server as shown at 475.

At least some of the sensor data, such as GPS, accelerometer and magnetometer data is also used to determine whether the animal has entered the boundary zone, as shown at 4005. If so, a check is made to see which direction the animal is pointing, or is at the boundary, indicated at 4010. If the animal has not entered the boundary zone, but instead is within the generally central area of the paddock, the process advances to step 4010 and then loops back to step 440 for the next cycle. The report rate refers to the frequency with which the tag sends information back to the server layer; a normal report rate typically means relatively infrequent reports in at least some embodiments. In general, it is not critical for most herd management issues to know where every animal is at all times. Instead, the general objective in some embodiments is to identify and report risk conditions. Of course, for some extremely high value animals, or high risk environments, more frequent or even relatively continuous monitoring may be desired, and is within the scope of the present invention. For purposes of clarity, the example of FIG. 4B will assume that the animals being monitored are the type of herd that requires only infrequent reporting as long as no error condition exists.

If the animal has entered the boundary zone, a check is then made at 4015 as to the direction the animal is pointing. If the animal is not pointed at the boundary, the process loops back to 4010 and then 440. However, if the animal is pointed at the boundary, a further check is made at 4020 to determine whether the animal is moving. If so, then stimulus is applied at step 4025 to induce the animal to return to a more central location within the paddock. In addition, the report rate is set higher than normal, at 4030, to facilitate prompt communication back to the server in the event human assistance becomes appropriate in the view of the user. The process then loops back to step 440.

If, on the next cycle, the animal remains moving toward the boundary, a further check is made at 4035 to determine whether the animal has reached the boundary, or, in some embodiments, a second boundary zone of the sort shown in FIG. 3B. If the animal has not reached the boundary, the existing level of stimulus is continued and the process loops as before. If the animal has reached the boundary, an amplified stimulus is applied to more aggressively induce the animal to return to the central portion of the paddock, as shown at 4040. The process then loops as before. If, on the next cycle, the animal remains at the boundary but has not moved outside the boundary, as checked at 4045, the amplified stimulus is continued. If, however, the animal has moved beyond the boundary the tag discontinues trying to direct the animal in regards for animal welfare and an error report is generated at 4055 for transmission to the network layer and ultimately to the user for determination of a solution. In many cases depending on terrain features and geographic locations of standard farm entities like watering holes it may be that an animal returns to the fenced area on their own. If this happens the alarm ends and the fence is then re-enabled without any need for human interaction. The process then loops back to step 440. As discussed above in connection with FIG. 3A, other alternatives for how to manage stimulus when an animal goes out of bounds can also be implemented, depending upon the embodiment.

It will be appreciated by those skilled in the art that, for some embodiments of the tag electronics, minimizing power consumption is critical. In some such embodiments, even regular use of the sensors becomes an unacceptable power drain. In such embodiments of the present invention, novel power conservation techniques can be implemented. For at least some implementations of the present invention, constant knowledge of the position of each monitored animal is not required, as long as the animals are within the paddock. In addition, in many environments where solar recharging of the battery is required for independent operation, insufficient battery power exists to power a GPS continuously. In such circumstances, an embodiment of the invention that allows the GPS to be off a significant portion of the time can be implemented. In such an embodiment, prediction of an animal's position relative to the virtual fence that defines a paddock can be estimated stochastically based on the animal's assumed velocity and an assumed straight line distance to the nearest boundary. In simple terms, such an approach may be thought of a sparse GPS with assume velocity dead reckoning. The long term mean velocity of an animal can be assumed to be p. It can also be assumed that the monitored animal takes one step per second, and the magnitude of each step is a Gaussian random uncorrelated variable with a standard of a and a variance of $\sigma^2$. Assuming the covariance to be zero, the summation of t number of steps equals the sum of the variances of that number of steps, or $[\sigma_1^2 + \sigma_2^2 + \sigma_3^2 \ldots \sigma_t^2]^{1/2}$ or $t^{1/2} * \sigma$. In a similar way, total distance can be estimated as $d(t) = t^{1/2} * \sigma + t * \mu$. While no closed form solution for t(d) is apparent, a one second precision on the solution is typically sufficient for a herd such as cows. Default values of a and p can be, for example 1.7 meters and 0, respectively. The default values can be loaded into the storage associated with the microcontroller of the animal tag, and can also be developed initially for a specific animal during the training state described in FIG. 1B. Expected cattle activity, determined from historical data, can materially assist in refining the values of $\sigma$ and $\mu$.

In an embodiment, such herd action can include resting, grazing, directed movement, standing, undirected movement, drinking, etc., as discussed in "Large-scale Livestock Grazing: A Management Tool for Nature Conservation". In addition, seasonal weather changes can be expected to impact activity levels, as can local land features. By monitoring animal activity and herd activity over a period of time, which can be weeks or even longer, refined estimates of $\sigma$ and $\mu$ can be developed and supplied to the tag associated with each monitored animal. Those estimates can be animal specific in at least some embodiments, and can be adjusted from the user device or the network layer to allow for off-nominal herd or animal activity, and, over time, can be further refined for each paddock of interest. It will be appreciated by those skilled in the art that the values of $\sigma$ and $\mu$ need to be conservative in most embodiments to ensure a high probability that the monitored animal remains within the paddock.

If a process is Gaussian, i.e., normally distributed, then the associated Random Walk (RW) coefficient can be calculated independent of the RW time interval. Actual cattle motion will, in at least some instances, be substantially more complex. In an embodiment, the motion is modeled by the superposition of multiple random processes such as, for example, Markov process(es)+Random Walk+occasional net herd motion. The superposition of random processes can be reasonably achieved by recognizing that, at various times (1 min, 5 min, etc.) different random processes will drive stochastic variability. Thus a wide range of delta-times & delta-positions are needed to characterize cattle motion. To accumulate this information, the animal tag will, in an embodiment, transmit to the network layer the most current and also prior positions and their associated times of validity. In addition, for the dead reckoning aspect of such estimations to be essentially worst case, it must be assumed that the animal is walking directly toward the nearest boundary line. For embodiments of animal tags having a magnetometer, this can be determined and the assumption avoided. To provide the Herd Manager relatively constant insight into herd activity levels, in some embodiments it is desirable to assign to each animal tag unique, evenly spaced talk times for communicating with the network layer.

With reference to FIG. 5, the operation of a low power mode for the animal tag, consistent with the foregoing discussion of Assumed Velocity Dead Reckoning, can be better appreciated. The process begins at 500 with a wakeup from sleep for both the microcontroller and the GPS module, both shown in FIG. 4A. Then, at step 505, the process waits for the GPS module to get its first fix, with that latency being monitored by the microcontroller of the animal tag. A check is then made at 510 to determine whether the Background Timer (BG) measurement is greater than the animal tag's (CR) transmit interval. If so, a wireless transmission from the tag is initiated at 515, together with a reset of the background timer. If either the BG time is not greater than the animal tag transmit interval as determined at step 510, or following the reset at step 515, a check is made at 520 to see whether the tag's GPS, and thus the monitored animal, is in bounds. If the animal is not in bounds, the process of FIG. 4B is initiated. If the animal is in bounds, the process of FIG. 5 advances to step 525 where a new sleep time duration is calculated, and the tag's electronics are set to sleep mode for the determined duration. In some embodiments, the process then loops back to step 500. In an alternative embodiment, the process moves from step 525 to 530, where the tag is set to sleep mode for the duration of the sleep time set in step 525, but that sleep state continues until motion by the animal is detected at the accelerometer in the tag. Once the accelerometer detects motion by the animal, the process returns to step 500. The sleep intervals can vary with the particular implementation, but for the exemplary embodiment of FIG. 4A, sleep durations of less than four seconds, between four and eight seconds, and greater than eight seconds. In at least some embodiments, when the monitored animal is near a boundary, the GPS is set to "continuous on", whereas longer sleep states can be selected when the animal is more centrally located within the paddock.

Referring next to FIGS. 6A-6D, the process for adjusting the stimulus level in relationship to distance can be better appreciated. The overall process can be appreciated from FIG. 6A, where an updated animal position is determined at step 600. A stimulation level is computed at 605 based on the updated position information, followed at 610 by updating the applied stimulation. A state-dependent time-variant update rate generator is applied at 615, after which the process loops back to 600. FIG. 6B illustrates an embodiment of the update cattle position step, 600, of FIG. 6A, where GPS and other sensor data provide inputs to an estimator and interpolator model and the model outputs longitude and latitude information at a rate of about ten times per second. Referring next to FIG. 6C, the stimulation level computation of step 605 [Fig. 6A] can be seen to receive the longitude and latitude information for FIG. 6B. The process computes the distances to the boundary zone lines 1-n, determines the minimum distance from among those lines, and provides an input to a shape function generator having an output "sti" [stimulus] supplied to an audio tone generator and an electrical shock stimulator as shown in FIG. 6D. Vibration stimulus can be initiated directly from FIG. 4A in an analogous manner.

Referring next to FIGS. 7A-7D, an embodiment of an efficient process for defining a virtual fence as the perimeter of a paddock can be better appreciated. In a system where none of wireless bandwidth, message length, and power consumption are limiting factors, the definition of a virtual fence can comprise entering longitude and latitude data for each of the vertices for the paddock. In such an embodiment, the position of the animal can be identified by its GPS data, and its distance from the nearest boundary can be calculated based on direct calculation from the longitude and latitude values.

Figures 7A, 7B:
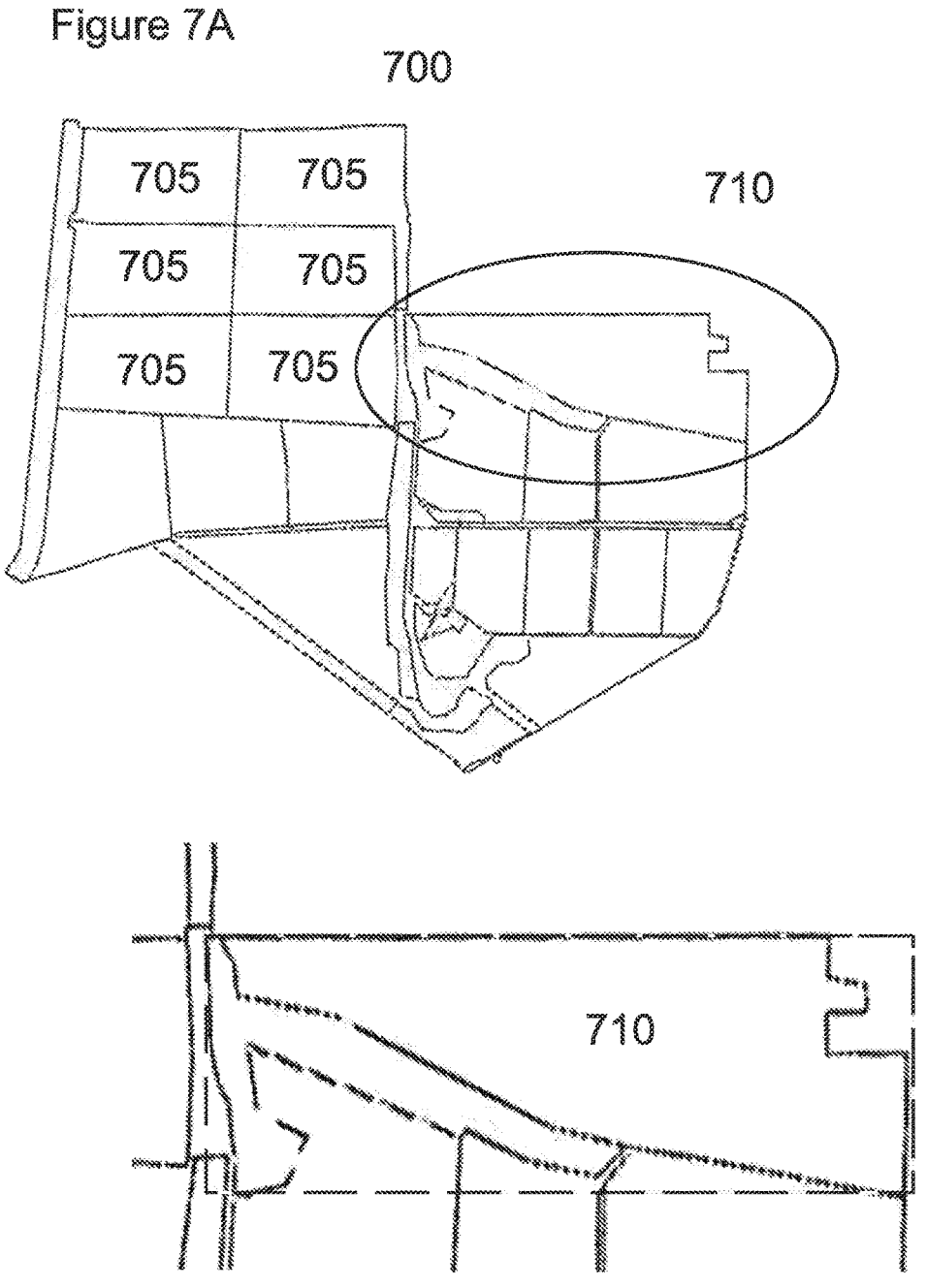

In some environments, however, optimizing use of wireless bandwidth, message length, or power consumption are significant factors. In such environments, it can be beneficial to conserve message length, for example, to conserve power consumption during message transmission. Two aspects of the present invention provide for efficient use of such resources. In FIG. 7A, ranch 700 can be seen partitioned into a plurality of paddocks 705, most of which are relatively rectangular. However, paddock 710, indicated within the circle, is irregular in shape and includes a pond along two edges. The paddock 710 is seen in greater detail in FIG. 7B. The process for defining the virtual fence for the paddock 710 begins by the user selecting longitude and latitude coordinates for the corners of a rectangle that encloses the entirety of the paddock. It will be appreciated that, for a rectangle, only the endpoints of a diagonal need to be defined, while other shapes may require additional information.

For purposes of simplicity, a rectangle will serve for illustration. In a presently preferred arrangement, the rectangle slightly exceeds the area of the intended paddock, although alternatively one or more of the corners can reside exactly on the corner of the intended paddock. Once the diagonal is defined, the rectangular area is calculated as VA(Lat)−VB(Lat)*VA(Long)−VB(Long). That rectangular area is then filled with a quantity n evenly distributed points in rows and columns. In an embodiment, the value of n can be either 256 or 64K depending on what kind of feature resolution is trying to be included within any arbitrary paddock. If a feature resolution using 256 points is selected, the points can be defined as numbers from 0-255 represented as a positive decimal value encoded as one byte. If higher feature resolution using 64K points is preferred, the 64K points can be defined as numbers from 0-65535 represented as a positive decimal value encoded as 2 bytes. Typically for most practically sided paddocks an arbitrary shape with reasonable feature resolution can be defined by 10-50 segments. Consequently, it is expected that 256 points will be enough resolution for most normal deployment situation, though those skilled in the art will see that the number of points can vary significantly depending upon the desired feature resolution and the size of the paddock. As an example, using a value of 256 for n provides reasonable resolution and provides a matrix of points which may be thought of as virtual fence posts.

Figure 7C:
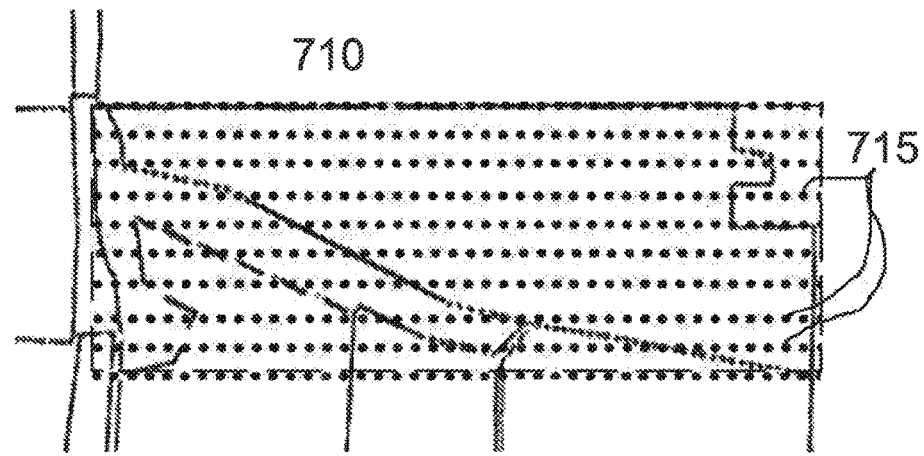
Figure 7D:
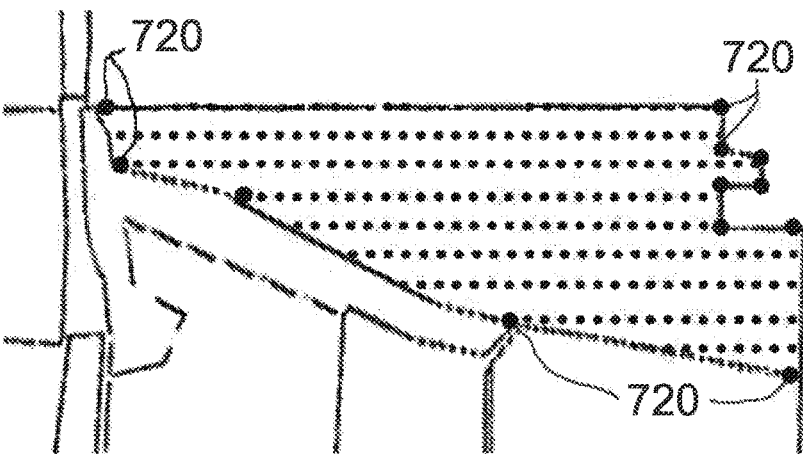

FIG. 7C illustrates such a matrix of virtual fence posts 715 distributed over the intended paddock 710. The virtual fence posts are each assigned a unique number, for example zero through 255. Since the virtual fence posts are evenly distributed and the vertices of the rectangle are known, the longitude and latitude of each of the virtual fence posts is known relative to the boundaries of the rectangle specified by the corner vertices VA and VB. The user then identifies the virtual fence posts that represent the vertices of the intended paddock, with twelve such vertices indicated at 720 in FIG. 7D. The virtual fence posts 720 thus define the coordinates of a virtual fence enclosing the paddock 710. The virtual fence posts outside the virtual fence are discarded while the virtual fence posts within the virtual fence provide simplified references for creating a downlink message to the tags defining the virtual fence and associated paddock.

The total message size achieved by such a compression algorithm can be expressed as follows: VA and VB have full resolution GPS latitude and longitude represented as 4 bytes latitude and 4 bytes longitude times two vertices (VA and VB) yields 16 bytes. Then for 256 virtual points that are evenly distributed across the rectangle specified by VA and VB are represented by a single byte representing the number of their post. Consequently, the formula to determine the number of bytes for a given number of segments is: (8 bytes for VA latitude/longitude)+(8 bytes for VB latitude/longitude)+(#segments*(1 byte/segment)). Using a 12 segment arbitrary paddock as an example it would require to transmit: (VA: 4 bytes lat+4 bytes long)+(VB: 4 bytes lat+4 bytes long)+(1 byte/segment*12segments)=28 bytes. If an uncompressed representation of 12 segments were to be sent each segment would consist of lat/long (4 bytes/4 bytes) such that you would have 12 segments*(4 bytes lat+4 bytes long)=96 bytes. The proposed algorithm resulted in 28 bytes instead of 96 bytes uncompressed yielding a (((96-28)/96)*100) =70.8% reduction in memory size.

In addition, the use of the virtual fence posts also simplifies reporting of current livestock position, by enabling the position of a monitored animal to be specified by the horizontal and vertical offset relative to either one of the vertices or one of the virtual fence posts, since the latitude and longitude of all vertices and all virtual fence posts are known at the network layer.

Referring next to FIGS. 8A-8C and 9A-9C, a still further alternative embodiment for defining virtual fences is illustrated. In particular, FIGS. 8A-8C illustrate an embodiment of a vector-based methodology for defining virtual fences, where the edges or boundaries of the paddock are either existing physical fences or are virtual fences defined by vectors having magnitude and direction. For convenience of illustration, and without limitation, the operation of the vector approach illustrated in FIGS. 9A-9C will be explained using an analogy to the "right hand rule" for analyzing electro-magnetic fields. Thus, as a convention and for simplicity of explanation, a vector 815 has a direction and a length. By establishing a coordinate system of an axial line 800 positioned congruent to the vector 815, and two lines 805 and 810 orthogonal to the line 800, one positioned at an beginning of the vector 815 and the other at the end of that vector, a set of reference orientations for developing virtual fences can be appreciated. It will be understood by those skilled in the art, from the foregoing as well as the more detailed explanation hereinafter, that the particular coordinate system taught here is exemplary and not limiting, as the specific terms used herein are not intended to be limited but instead have been selected for ease of understanding. In the "right hand rule" analogy used herein, for the vector 815 the "field" would be going into the paper, and so this is defined as "inside" for convenience of explanation. Thus, to the lower right of vector 815 is "inside" while to the upper left is "outside". Points that are beyond the ends of the vector are "off-axis" and either inside or outside depending upon which side of the line 800 they fall on.

Using the conventions of FIG. 8A, and now referring specifically to FIG. 8B, an embodiment of the establishment and operation of a paddock defined by vector-based virtual fences can be understood. To assist with understanding, assume that the point 820 is a tagged cow in accordance with the invention. Then, assume that a centroid point 823, which can be selected either arbitrarily or by any convenient means, provides a reference point for vectors 825-850. Note that, using the vectors are joined end to end, and the directions show that the vectors, each of which represents a paddock edge, are arranged in the clockwise direction. Thus, the interior space is "inside" the area defined by the vectors, and thus forms the paddock.

Next, consider the location of the cow of interest, indicated at 820. Applying the convention of FIG. 8A, and starting with vector 825, it can be seen that the cow 820 is to the right of vector 825 but beyond its end point. Thus the point 820 is "off-axis inside", as shown by the legend at the right of the figure. With respect to vectors 830, 835, 840 and 845, however, the point 820 is to the left, and also beyond their respective end points, and thus the point 820 is off-axis outside relative to those vectors, again as indicated by the legend. But, for vector 850, the point 820 is to the right of that vector according to the right hand rule convention, since the arrow points downward. But the point is still beyond the end points of the vector 850, and so the point 820 is said to be off-axis inside relative to that vector. Finally, comparing the point 820 to vector 855, it can be seen that the point is to the right of the left-pointing vector 855, and within the end points of that vector. Thus, the point 820 is said to be inside the vector 855, again in accordance with the legend.

These relationships impact how the cow is monitored and guided, as discussed in more detail hereinafter. In addition to determining whether a given cow is inside or outside under the coordinate system, it is important to understand which vector, or paddock edge, is to be used to determine whether an action should be taken to manage the cow. For this determination, the concept of "edge cancellation" is helpful. Thus, for FIG. 8B, the edge vector 840 is nearer the cow 820 than the edge vector 855, and thus the vector 840 "cancels" any effect the vector 855 might have on the management of the cow 820.

FIG. 8C offers a different scenario, as to both the coordinate system of FIG. 8A and the concept of cancellation. The cow at point 860 can be seen to be within the paddock defined by the edge vectors 865-895, all arranged in clockwise order to define the interior of the paddock. A centroid 863 provides the reference point. From the above discussion, it can be seen that the point 860 is inside vectors 865, 880, 885, 890, and 895. It is off-axis inside vector 870, and outside vector 875. However, due to vector 880 being located between vector 875 and the cow at 860, edge vector 880 cancels edge vector 875.

In the foregoing discussions, the presence of centroids 823 and 863 have been mentioned. In some embodiments, for example those, a single reference point relative to which the edge vectors are defined permits improved scaling as well as efficient message packing. The centroid can be any convenient point, and, as shown by the points 823 and 863, can be either inside the paddock or outside.

As with the paddocks of FIGS. 3A-3B, each of the paddocks of the embodiment of FIGS. 8A-8C includes a zone within the boundaries of the paddock where a monitored animal will be stimulated to move back toward the safe inner portion of the paddock. More than one zone may be provided, as shown in FIG. 3B and revisited in connection with FIG. 9A. However, for convenience of explanation of the vector approach, those shock zones have been omitted from FIGS. 8A-8C. A benefit of the edge vector approach of FIGS. 8A-8C is the ability to allow monitored animals to pass through an edge vector in one direction, without being shocked or otherwise stimulated, while preventing them from passing through the edge vector in the other direction without being shocked, etc. The use of "inside" and "outside", together with monitoring the direction of travel of the monitored animal, allows the edge vector to work as a one-way gate.

Figure 9A:
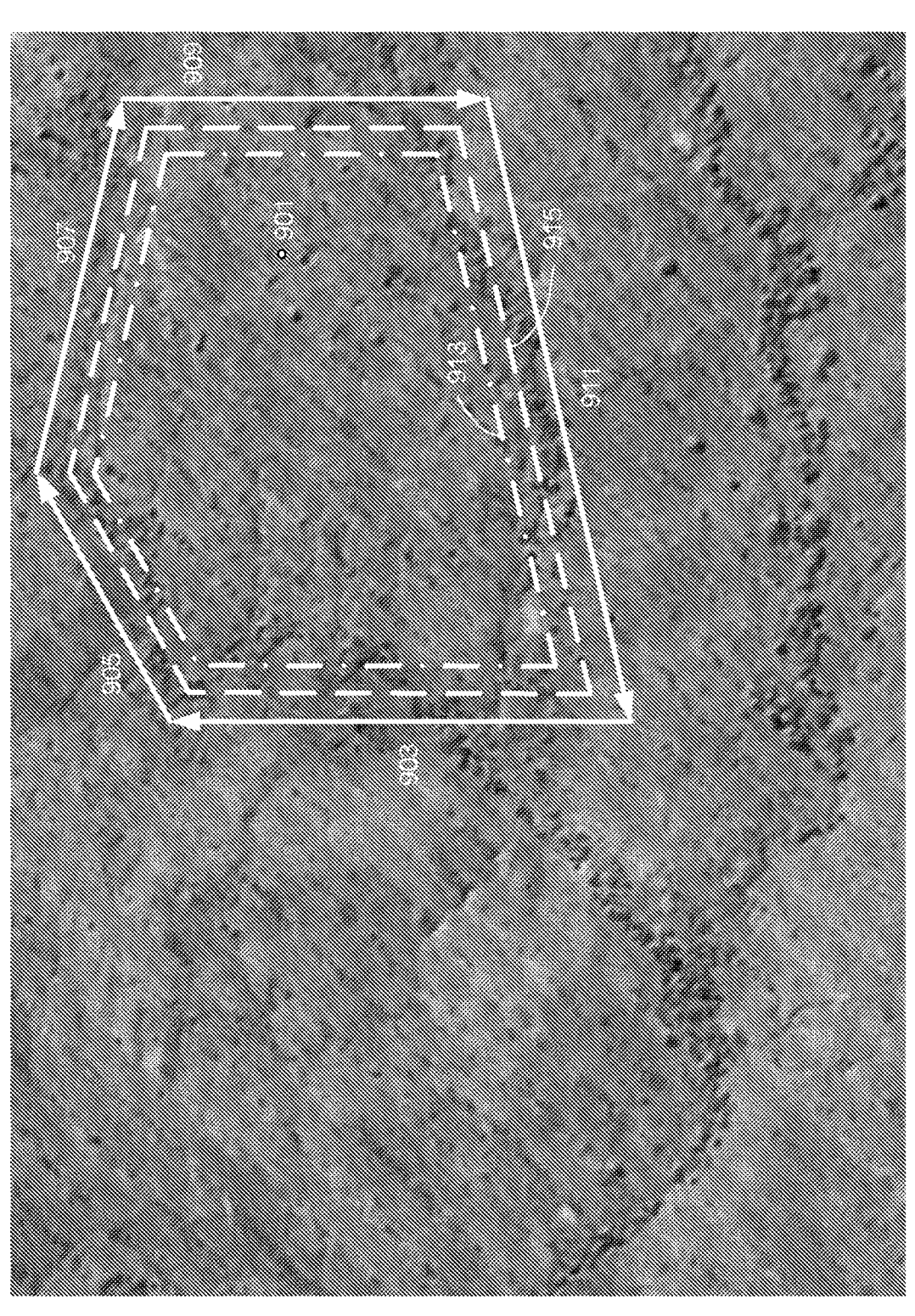

The concept of a one-way gate, as well as multiple stimulus zones as implemented in an embodiment of a paddock in accordance with FIGS. 8A-8C, can be appreciated from FIG. 9A. A ranch 900 offers a variety of terrain, including various contours that may be less friendly to grazing animals than others. A paddock, defined by centroid 901 and a plurality of edge vectors 903-905-907-909-911, all arranged clockwise, is configured to map well onto the terrain. The paddock typically will not cover all available terrain, although it could. Within the paddock, the system of the present invention configures a first stimulus zone 913, the boundary of which is shown essentially as a scaled down version of the paddock boundaries. A cow entering the first stimulus zone 913 may receive an auditory or haptic stimulus to encourage the cow to turn back toward the center. If the cow continues moving toward the boundary, it enters a second stimulus zone, similar to that described in connection with FIGS. 3A-3B. At that point the cow is stimulated with either a louder audio signal, a more aggressive haptic signal, an electric shock, or some combination thereof.

But, if the cow continues past the boundary, in some embodiments it can be desirable to cease the stimulus in an effort to encourage the cow or other animal to return to within the boundary. An example is a cow that is suddenly startled, perhaps by a snake, and flees the immediate area despite the stimulus. As herd animals, most cows will return fairly soon to the rest of the herd on their own. Yet, if the cow is stimulated adversely upon crossing the boundary, the cow may be discouraged from returning to the herd. The tag 110 tracks the direction of the cow's movement, and is also aware of the boundary. By recognizing that the cow is going from "outside" the boundary to "inside" the boundary, the logic within the tag determines not to stimulate the cow as it makes its way back to the herd. However, once the cow is inside the boundary, or within the boundary plus some arbitrary "safe entry" zone, the logic of the tag reactivates the stimulus zone checks and will reapply stimulus as appropriate to ensure the cow remains within the paddock.

Figure 9B:
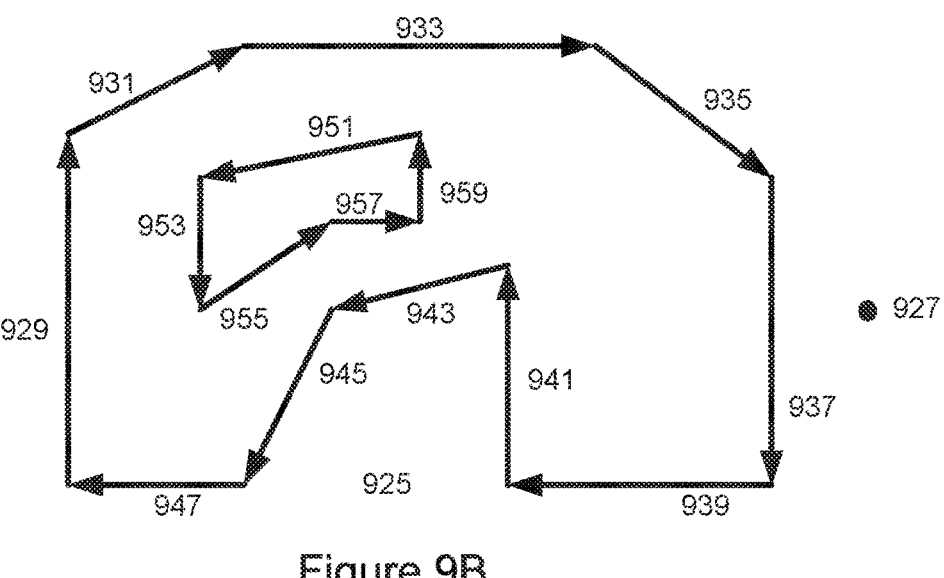

Referring next to FIG. 9B, another advantage of the edge vector approach can be better appreciated. In particular, FIG. 9B shows a first "inclusion" paddock, but also shows a second "exclusion" paddock. Thus, edge vectors 929-947, all advancing in a clockwise direction, define an "inclusion" paddock as discussed above for FIGS. 8B-8C and 9A. And, as noted before, although not shown for simplicity and clarity, one or more stimulus zones exist within the inclusion portion of the paddock. However, vectors 951-959 advance in a counterclockwise direction. Thus, using the right hand rule, the interior of the shape is "outside", and the stimulus zone surrounding the shape defined by those vectors is on the outside of the shape, not the inside. Thus, a cow coming from inside vector 929 and approaching a point on vector 953 will be stimulated before reaching the vector 953 in an effort to keep the cow in the space between the two shapes. This is helpful because it is often desirable to let cattle graze over a large area that includes one or more dangerous structures, such as a bog or similar high risk area. By excluding that high risk area, the permissible paddock area can be large and allow the cattle to roam and graze more freely. As with the other vector-based paddocks, a centroid 927 provides a reference point for the paddock of FIG. 9B.

Figure 9C:
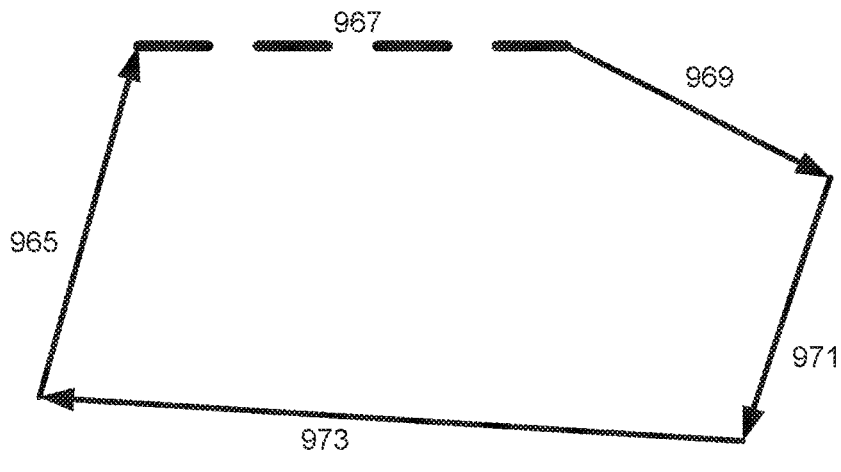

FIG. 9C integrates virtual fences with physical fences, to permit a farmer or rancher to take best advantage of expensive existing infrastructure. It is well understood in the industry that many miles of fence already exist. By being able to create a paddock that takes advantage of such infrastructure, while also leveraging the advantages of the virtual fence, a more efficient use of the ranch land and related resources is made possible. Thus, for FIG. 9C, a paddock is defined by edges 965, 967, 969, 971, and 973. However, edge 967 is a physical fence, as shown by the dashed line and no vector direction. The remaining vectors advance clockwise, so the paddock is an inclusion paddock. As will be discussed hereinafter, the server of the system stores whether an edge is a physical boundary or a virtual boundary. However, in some embodiments, it may be desirable to establish a stimulus zone on the approach to a physical boundary, essentially the same as for a virtual boundary. This is particularly true if the physical boundary is not a physical fence, but a dangerous landscape feature such as a cliff.

Figure 9D:
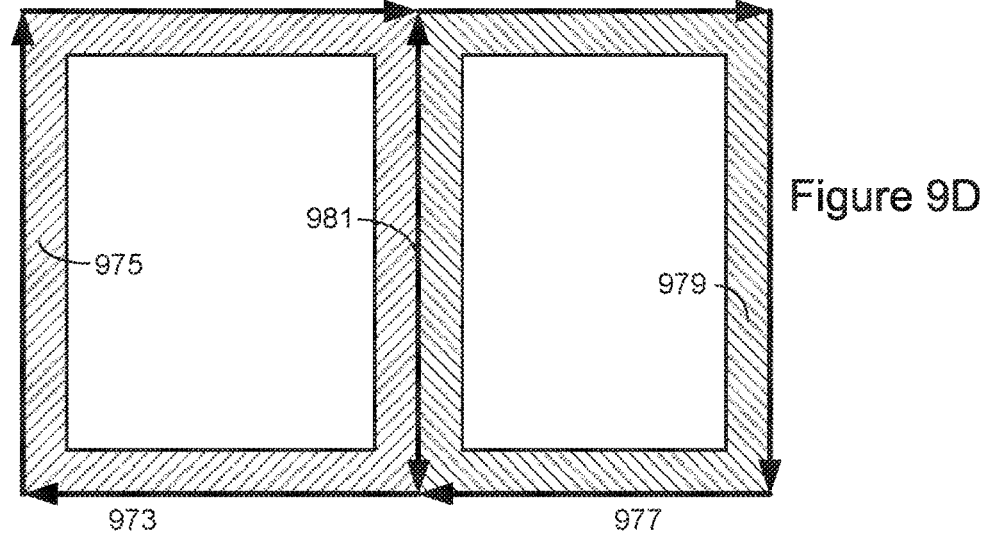

FIG. 9D illustrates a still further advantage of the edge vector approach, where two paddocks share a single edge or boundary. Edge vectors as discussed above form a first paddock 973 with a stimulus zone 975. Likewise, edge vectors form a second paddock 977 with stimulus zones 979. Edge vector 981 forms a common boundary, and so the edge vector is double ended. Typically, direction can be stored in memory as a single byte, such that reversing just a single byte allows efficient management of movement of cattle across the boundary established by edge vector 981. For example, by changing vector 981 so that it only points up, cattle are free to roam into paddock 977 in accordance with the one-way gate operation described above. But, change vector 981 to point only down, and the cattle are free to flow the other direction, yet stopped from going back.

The movement of cattle across such boundaries is helpful in moving a herd from one paddock to another paddock where both are defined by edge vectors. This operation can be better appreciated from FIGS. 10A-10G. In FIG. 10A, paddock 983 is illustrated with associated stimulus zone 985 just inside the paddock boundary, along with paddock 987 and associated stimulus zone 989 just inside that boundary. Cattle are typically within the paddock but not in the stimulus zone. To move the cattle from paddock 983 into paddock 987, the process begins by enlarging paddock 983, and also enlarging shock zone 985, both in the direction of the target paddock 987, as shown in FIG. 10B. Next, as shown in FIG. 10C, the paddock 983 is incrementally increased again, and the shock zone 985 is again enlarged in the direction of the target paddock. This process is repeated in FIG. 10D, to the point that the two paddocks share a common boundary. Then, in FIG. 10E, the boundary between paddocks 983 and 987 is removed, or set to be a one-way gate, such that the cattle can move into target paddock 987. The shock zone 985 is again increased to drive the cattle into the new paddock. Next, as shown in FIG. 10F, the shock zone 985 is again increased. Finally, as shown in FIG. 10F, the shock zone 985 has been increased to the point that all of the cattle are now within the shock zone 989 of paddock 987. At this point, the paddock 983 and associated shock zone 985 can either be deactivated or can be restored to its original size. It will be appreciated by those skilled in the art, given the teachings herein, that the foregoing process could also have been achieved by enlarging target paddock 987 in the direction of source paddock 983, and then reducing the size of the target paddock to induce the cattle to move into the intended space of the target paddock. Those skilled in the art will recognize, too, again given the teachings herein, that the entire source paddock or the entire target paddock could have been moved, similar to the operations shown in FIG. 3C-3F herein. The foregoing discussion is intended to include, without limitation, all such variations on the movement of a herd from paddock to paddock.

Referring next to FIG. 11, the movements shown graphically in FIGS. 10A-10G can be appreciated in state diagram form. In particular, the move starts at 1100, typically as the result of a schedule downloaded into the tags in advance from the system servers running the management software. At that point the management zone is set to the requested move length. The boundary of the shock zone is expanded by a desired amount, for example enough to place one or more animals within 25% of the sound boundary, as shown at 1105. A cool down period follows, shown at 1115, after which the state of the animals is checked to see if the move is complete. If so, the process terminates as shown at 1110. However, most moves will require multiple iterations, and so the process continues at 1120 where the shock zone is further increased, again by, for example, 25%, to induce the herd to move to the new paddock. When the herd moves sufficiently, the device status indication transitions from stimulus [sound] to tracking. Once the move is completed, the management zone is adjusted and the process terminates as discussed above.

In some embodiments, it can be desirable to monitor the heading of the cow or other animal as a factor in determining whether a stimulus should be applied. FIG. 12 illustrates the progressive movement of a monitored animal as it moves from the central portion of a paddock, beginning at 1200, into the stimulus zone. For simplicity of explanation, the paddock is assumed to be aligned straight north. In an embodiment, no stimulus is applied while in the paddock and not in the stimulus zone. However, to better ensure that the monitored animal stays within the safe portion of the paddock, if the animal enters the stimulus zone and their heading is within, for example, +/−110 degrees of a boundary, stimulus is applied. The particular range of headings for application of shock can vary depending upon the shape of the paddock, the particular animal, and similar factors. Thus, for the animal of FIG. 12, once the animal enters to shock zone as shown at 1210, stimulus is applied. At this point, the animal either goes straight, turns right, or turns left. The decision to apply shock is, in an embodiment based upon a determination of the distance of the tag from the closest edge. The decision can be made by the tag's logic in some embodiments, or, in other embodiments, can be determined at the server. In the example of the cow's movement in FIG. 12, it can be seen that, if the cow turns right, as shown at 1215, it approaches the boundary but begins turning, as shown by the arrow indicating actual cow direction. The stimulus, or edge pressure, applied to the cow causes the cow to turn further, again as indicated by the arrow at 1220.

Should the cow turn left, toward the corner of the paddock as shown at 1225, slight movements of the cow may cause a change in which edge is closest. In some embodiments, and depending upon the shape of that portion of the paddock, the headings for which shock is applied may be combined, but in other environments the decision to apply stimulus or not is based only on which edge is closest.

With the foregoing in mind, the operation of the system as a whole, from setup to herd movement, can now be better appreciated. Setup for a new enterprise starts with creation of an organization/enterprise/ranch/farm in a server such as a LoRa server, which in turn causes the system to automatically assign a unique ID for that enterprise. Then one or more nodes are configured. Node configuration can involve selection of frequency band [e.g., 800 MHz, 900 MHz, 700 MHz, etc.), maximum permissible power, and security key configuration. The node ID's and security keys are loaded into the communications server, for example a LoRa server as discussed hereinabove. The devices will appear in the herd management software once added to the LoRa server and powered up.

In addition, in an embodiment, tags or collars can be added to the server at this point, or can be added later. Like the nodes, those devices will not be recognized by the server until they are powered up. Tags/collars will initially show up with a default GPS location, but, once the tag obtains a reliable GPS fix, the displayed location of each tag will reflect the GPS data for that tag. Configuration of a LoRa server comprises setting a device profile, which can include OTAA, regional network server links, MAC version, regional version, MAX EIRP, among other things. In some embodiments, an application profile is created, which can include herd management routing. Adding of devices can comprise adding a device profile together with adding the associated security application key. User setup involves assigning a user account to a farm. In an embodiment, each account is associated with only one farm at a time, but can be switched among farms. The enterprise profile for each farm can be unique, such that switching among farms can result in different orientation screens.

In an embodiment, setting up and using the herd management software typically starts with a "Farm View" page and provides access to account management, enterprise farm management, and history. More relevant to the foregoing discussion is that that page also provides an interface for managing paddocks, herds, and tags/collars. Adding a paddock can be performed in multiple ways, including manually clicking on points on a map, using latitude and longitude to establish vertices, or importing pre-planned maps from third party services such as Google Earth. A map or satellite view can be displayed so that the terrain can be reviewed while establishing the vector beginning and end points.

Paddocks are, as discussed herein, enclosed polygons and can either be an inclusion paddock or an exclusion paddock (see FIG. 9B). Likewise, a paddock can comprise both physical and virtual edges (see FIG. 9C). The total number of edges a paddock can have depends upon the desired implementation, where considerations of power, memory and bandwidth limitations can be important. In an embodiment, an exemplary paddock can have sixteen edges. Once the paddock edges are defined, the paddock is assigned a unique name within the group of paddocks. In an embodiment, the width of the management zone, or shock zone, is set, for example ten meters. The type of paddock, inclusion or exclusion, is also set, and each edge is identified as either physical or virtual. In some embodiments, a choice of setting a management zone for a physical boundary is also provided. Likewise, a paddock may be entirely physical boundaries. The paddock edges can be edited/modified in any convenient manner, such as click and drag. The "Farm View" display can be configured to display one or more paddocks, depending upon the particular implementation.

A herd is entered into the herd management software as the result of one or more tags being added to the server, and thereafter being powered up as discussed above. Each tag/collar has a unique ID and is affixed to its respective animal, and the location of each collar is displayed in the Farm View once accurate GPS data is received following power up of the tag. In an embodiment, each tag can store a plurality of paddock definitions, or slots, for example 16 different paddocks. The tag can also store one or more schedules for movement of that animal from one paddock to another. Typically that movement will occur together with the herd the animal is associated with.

Once the group of collars that comprises a herd have returned accurate GPS data, those cattle appear on the herd management display for that herd, typically within a paddock. Tags typically can be in only one herd at a time, but can be moved from herd to herd individually or in combination with other tags/animals. Herds can be combined, split, subdivided, edited or added to.

Within the herd management software, herds are assigned to paddocks, In an embodiment, each herd can have associated therewith a plurality of paddock slots, for example, sixteen or any other suitable number. Each paddock slot can be empty or occupied, and each paddock slot can have multiple states, such as "current state" or "next state." A paddock within each slot can either be "active" or "inactive". Each paddock can have associated therewith a schedule, defining when the herd associated with that paddock will be moved into or out of the paddock. Virtual fences can be set to active or inactive, either immediately (i.e., "Now") or according to a schedule.

To manage a herd, the paddock definitions and schedules for that herd must be downloaded to all of the associated tags. Given the power and bandwidth constraints necessary for the tags to operate for an extended period, typically measured in at least months and preferably years, in some embodiments downloading can take tens of seconds per device, with suitable error correction to ensure accurate transmission. In some embodiments, the herd management software can display a heat map, which effectively shows the concentration of the herd. In some embodiments, selected groups or individual animals can be displayed on the heat map.

Those skilled in the art will also recognize that, if wireless bandwidth, memory, and power are sufficient such that none limit system performance, in an embodiment a grid of virtual fence posts can be created for an entire ranch. In addition, in some embodiments, the spacing between adjacent fence posts need not be uniform as long as the relative location of one virtual fence post to another is stored in a suitable manner. Such an approach can be helpful where the terrain of a paddock varies materially such as trees, rock formations, or cliffs.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:
1. A tag attached to an animal, the tag comprising:
a battery;
a location sensor; and
one or more motion sensors;
a processor configured to:
  obtain information on a virtual fence defining a perimeter within which an animal is allowed to roam;
  acquire animal location information on the animal from the location sensor;

acquire animal motion information on the animal from the one or more motion sensors;

turn off the location sensor for a sleep time during which the location sensor is turned off so that it consumes at least less power from the battery compared to other times when the location sensor is turned on, wherein the sleep time is determined based at least in part on animal motion information.

2. The tag of claim 1, wherein the one or more motion sensors include at least on of: an accelerometer, or a magnetometer.

3. The tag of claim 1, wherein the animal motion information indicates whether the animal is moving or not moving.

4. The tag of claim 1, wherein the animal motion information indicates whether the animal is walking, running, resting, eating, drinking, mating, sleeping, or grazing.

5. The tag of claim 1, wherein the animal motion information includes a direction the animal is moving.

6. The tag of claim 1, further comprising a stimulus module for applying a stimulus to the animal, wherein the stimulus is an audio and/or electrical stimulus.

7. The tag of claim 6, wherein the stimulus is based on at least one of: the animal motion information, or the animal location information.

8. The tag of claim 1, wherein the animal location information comprises the relative distance between the animal's predicted location and the virtual fence.

9. The tag of claim 1, wherein the animal location information comprises the relative distance between the animal's actual location and the virtual fence.

10. The tag of claim 6, additionally comprising a heart rate sensor.

11. The tag of claim 10, wherein the determination on whether to apply the stimulus to the animal also include information from the heart rate sensor.

12. The tag of claim 6, additionally comprising a thermometer.

13. The tag of claim 12, wherein the determination on whether to apply the stimulus to the animal also include information from the thermometer sensor.

14. A method of operating a tag attached to an animal comprising:

obtaining, by a processor, information on a virtual fence defining a perimeter within which an animal is allowed to roam;

acquiring, by the processor, animal location information on the animal from a location sensor;

acquiring, by the processor, animal motion information on the animal from one or more motion sensors;

operating the location sensor in a low power mode, during which the location sensor consumes at least less power from a battery compared to other times, wherein the location sensor is operated in a low power mode based at least in part on the animal motion information.

15. The method of claim 14, further comprising applying a stimulus to the animal, using a stimulus module, wherein the stimulus is an audio and/or electrical stimulus.

16. The method of claim 15, wherein the stimulus is based on at least one of: the animal motion information, or the animal location information.

17. The method of claim 14, wherein the one or more motion sensors include at least one of: an accelerometer, or a magnetometer.

18. The method of claim 14, wherein the animal motion information indicates whether the animal is moving or not moving.

19. The method of claim 14, wherein the animal motion information indicates whether the animal is walking, running, resting, eating, drinking, mating, sleeping, or grazing.

20. A tag attached to an animal, the tag comprising:

a battery;

a location sensor; and one or more motion sensors;

a processor configured to:

obtain information on a virtual fence defining a perimeter within which an animal is allowed to roam;

acquire animal location information on the animal from the location sensor;

acquire animal motion information on the animal from the one or more motion sensors; and operate the location sensor in a low power mode, during which the location sensor consumes at least less power from the battery compared to other times, wherein the location sensor is operated in a low power mode based at least in part on the motion information.

\* \* \* \* \*